(12) United States Patent
Zeng

(10) Patent No.: US 10,424,953 B2
(45) Date of Patent: Sep. 24, 2019

(54) POWER ADAPTER AND MOBILE TERMINAL

(71) Applicant: GUANGDONG OPPO MOBILE TELECOMMUNICATIONS CORP., LTD., Dongguan (CN)

(72) Inventor: Yuanqing Zeng, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 199 days.

(21) Appl. No.: 15/379,194

(22) Filed: Dec. 14, 2016

(65) Prior Publication Data

US 2017/0093189 A1 Mar. 30, 2017

Related U.S. Application Data

(63) Continuation of application No. PCT/CN2015/094625, filed on Nov. 13, 2015.

(30) Foreign Application Priority Data

May 13, 2015 (WO) ............... 2015/078898
May 13, 2015 (WO) ............... 2015/078908

(51) Int. Cl.
*H02J 7/00* (2006.01)
*H04M 19/08* (2006.01)
(Continued)

(52) U.S. Cl.
CPC ........... *H02J 7/0044* (2013.01); *H02J 7/007* (2013.01); *H02J 7/0021* (2013.01);
(Continued)

(58) Field of Classification Search
CPC ..................................................... H02J 7/0044
(Continued)

(56) References Cited

U.S. PATENT DOCUMENTS

| 7,688,037 B2 * | 3/2010 | Huh ............... H02J 7/0072 320/112 |
| 8,386,814 B2 * | 2/2013 | Tom ............... G06F 1/266 307/151 |

(Continued)

FOREIGN PATENT DOCUMENTS

| CN | 101771178 A | 7/2010 |
| CN | 102427260 A | 4/2012 |

(Continued)

*Primary Examiner* — Yalkew Fantu
(74) *Attorney, Agent, or Firm* — Young Basile Hanlon & MacFarlane, P.C.

(57) ABSTRACT

The present disclosure provides a power adapter and a terminal. The power adapter is coupled to a mobile terminal via a USB interface, and a data line of the USB interface is used for a bidirectional communication between the power adapter and the mobile terminal. The power adapter supports a normal charging mode and a quick charging mode, and a charging current of the quick charging mode is greater than a charging current of the normal charging mode. The method includes: communicating, by the power adapter, with the mobile terminal via the data line of the USB interface, so as to determine to charge the mobile terminal in the quick charging mode; and adjusting, by the power adapter, a charging current of the power adapter to be the charging current of the quick charging mode to charge the mobile terminal.

27 Claims, 7 Drawing Sheets

Communicate with a power adapter bidirectionally via a data line of a USB interface by a mobile terminal, so as to cause the power adapter to determine to charge the mobile terminal in a quick charging mode — 210

Receive a charging current of the quick charging mode from the power adapter by the mobile terminal to charge a battery of the mobile terminal — 220

(51) Int. Cl.
*H02J 7/04* (2006.01)
*H02J 7/02* (2016.01)

(52) U.S. Cl.
CPC .............. *H02J 7/0052* (2013.01); *H02J 7/02* (2013.01); *H02J 7/04* (2013.01); *H04M 19/08* (2013.01); *H02J 7/0068* (2013.01); *H02J 2007/0059* (2013.01); *H02J 2007/0062* (2013.01); *H02J 2007/0096* (2013.01)

(58) Field of Classification Search
USPC ......................................................... 320/114
See application file for complete search history.

(56) References Cited

U.S. PATENT DOCUMENTS

| | | | |
|---|---|---|---|
| 2006/0284595 A1* | 12/2006 | Hsieh | H02J 7/0077 320/115 |
| 2007/0075680 A1 | 4/2007 | Chung et al. | |
| 2008/0084189 A1 | 4/2008 | Kim | |
| 2013/0285599 A1 | 10/2013 | Hao | |
| 2015/0035477 A1* | 2/2015 | Wong | H02J 7/0068 320/107 |
| 2016/0064978 A1 | 3/2016 | Lei et al. | |

FOREIGN PATENT DOCUMENTS

| | | | | |
|---|---|---|---|---|
| CN | 202268816 U | 6/2012 | | |
| CN | 102820682 A | 12/2012 | | |
| CN | 102957193 A | 3/2013 | | |
| CN | 103475068 | 12/2013 | | |
| CN | 103762702 A | 4/2014 | | |
| CN | 103779907 A | 5/2014 | | |
| CN | 103795040 A | 5/2014 | | |
| CN | 104065126 A | 9/2014 | | |
| CN | 104065147 A | 9/2014 | | |
| CN | 104092274 A | 10/2014 | | |
| CN | 104124483 A | 10/2014 | | |
| CN | 104135057 A | 11/2014 | | |
| CN | 104269893 A | 1/2015 | | |
| CN | 104393627 A | 3/2015 | | |
| CN | 104393628 A | 3/2015 | | |
| EP | 2775654 A1 | 9/2014 | | |
| EP | 2854253 A1 | 4/2015 | | |
| EP | 2892214 A2 | 7/2015 | | |
| EP | 2892214 A2 * | 7/2015 | ............... | H02J 3/14 |
| EP | 3101766 A1 | 12/2016 | | |
| JP | 2007288889 A | 11/2007 | | |
| JP | 201234554 A | 2/2012 | | |
| JP | 2013198262 A | 9/2013 | | |
| KR | 1020140120699 A | 10/2014 | | |
| WO | 2013178191 A2 | 12/2013 | | |
| WO | 2014077978 A1 | 5/2014 | | |

\* cited by examiner

POWER ADAPTER AND MOBILE TERMINAL

CROSS REFERENCE TO RELATED APPLICATIONS

This application is a continuation application of PCT Patent Application No. PCT/CN2015/094625, entitled "FAST CHARGING METHOD, POWER ADAPTER AND MOBILE TERMINAL," filed on Nov. 13, 2015, which claims priority to PCT Patent Application No. PCT/CN2015/078908, filed on May 13, 2015, and PCT Patent Application No. PCT/CN2015/078898, filed on May 13, 2015, all of which are hereby incorporated in their entireties by reference.

TECHNICAL FIELD

The present disclosure relates to charging field, and more particularly to a power adapter and a mobile terminal.

BACKGROUND

Presently, mobile terminals (e.g., smart phones) become more and more popular with consumers. However, the power consumption of mobile terminals is great, thus mobile terminals need to be charged frequently. As the battery capacity of mobile terminals becomes greater and greater, correspondingly, the charging time becomes longer. How to realize quick charging is a problem that needs to be solved instantly.

In the present technology, to achieve the purpose of quick charging, the output current of a power adapter is directly increased without consideration of endurance of a mobile terminal, which will result in a phenomenon of overheat or even burnout of the mobile terminal, and reduces the lifespan of the mobile terminal.

SUMMARY

The embodiments of the present disclosure provide a power adapter and a mobile terminal.

In a first aspect, a power adapter is provided. The power adapter is coupled to a mobile terminal via a USB interface. A power line of the USB interface is used for the power adapter to charge the mobile terminal, and a data line of the USB interface is used for a bidirectional communication between the power adapter and the mobile terminal. The power adapter supports a normal charging mode and a quick charging mode, and a charging current of the quick charging mode is greater than a charging current of the normal charging mode. The power adapter comprises: a communication circuit configured to communicate with the mobile terminal bidirectionally via the data line of the USB interface, so as to determine whether to charge the mobile terminal in the quick charging mode; and a current adjusting circuit configured to adjust a charging current of the power adapter to be the charging current of the quick charging mode to charge the mobile terminal.

In a second aspect, a mobile terminal is provided. The mobile terminal is coupled to a power adapter via a USB interface. A power line of the USB interface is used for charging the mobile terminal, and a data line of the USB interface is used for a bidirectional communication between the mobile terminal and the power adapter. The mobile terminal supports a normal charging mode and a quick charging mode, and a charging current of the quick charging mode is greater than a charging current of the normal charging mode. The mobile terminal comprises: a communication circuit configured to communicate with the power adapter bidirectionally via the data line of the USB interface, so as to cause the power adapter to determine to charge the mobile terminal in the quick charging mode; and a charging circuit configured to receive the charging current of the quick charging mode from the power adapter to charge a battery of the mobile terminal.

In a third aspect, a power adapter is provided. The power adapter is coupled to a mobile terminal via a USB interface, a power line of the USB interface is used for the power adapter to charge the mobile terminal, and a data line of the USB interface is used for a bidirectional communication between the power adapter and the mobile terminal. The power adapter supports a normal charging mode and a quick charging mode, and a charging current of the quick charging mode is greater than a charging current of the normal charging mode. The power adapter comprises a communication circuit and a charging circuit. The communication control circuit is configured to determine to activate the quick charging mode, conduct a handshake communication with the mobile terminal via a second instruction to determine a charging voltage of the quick charging mode, conduct a handshake communication with the mobile terminal via a third instruction to determine the charging current of the quick charging mode, adjust an output voltage and an output current of the power adapter to be the charging voltage of the quick charging mode and the charging current of the quick charging mode respectively to enter a constant current phase, and conduct a handshake communication with the mobile terminal via a fourth instruction during the constant current phase to adjust the output current of the power adapter, so as to control the charging circuit to charge the mobile terminal in a multi-stage constant current mode.

In a fourth aspect, a mobile terminal is provided. The mobile terminal is coupled to a power adapter via a USB interface. A power line of the USB interface is used for charging the mobile terminal, and a data line of the USB interface being used for a bidirectional communication between the mobile terminal and the power adapter. The mobile terminal supports a normal charging mode and a quick charging mode, and a charging current of the quick charging mode is greater than a charging current of the normal charging mode. The mobile terminal comprises a communication control circuit and a charging circuit. The communication control circuit is configured to determine to activate the quick charging mode, conduct a handshake communication with the power adapter via a second instruction to determine a charging voltage of the quick charging mode, conduct a handshake communication with the mobile terminal via a third instruction to determine the charging current of the quick charging mode, and conduct a handshake communication with the power adapter via a fourth instruction when the power adapter adjusts an output voltage and an output current of the power adapter to be the charging voltage of the quick charging mode and the charging current of the quick charging mode respectively and enters a constant current phase, so as to cause the power adapter to adjust the output current to charge the mobile terminal in a multi-stage constant current mode via the charging circuit.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative work.

DETAILED DESCRIPTION

Figure 1:
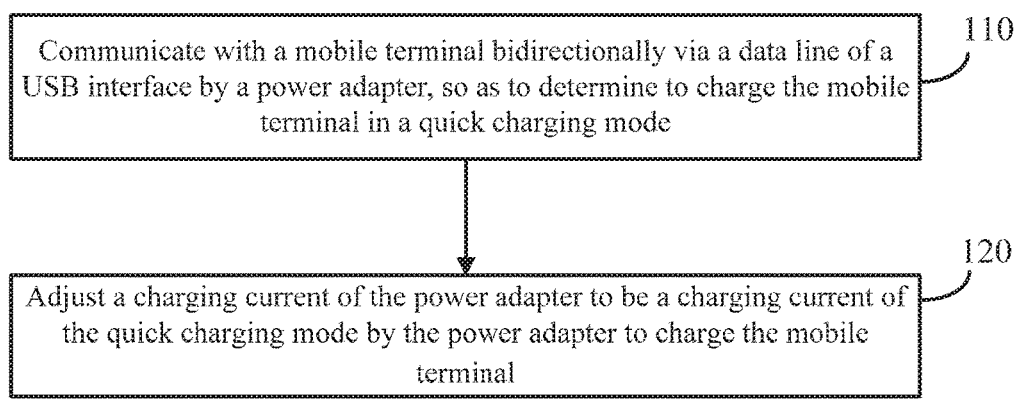
FIG. 1 is a schematic flow chart of a quick charging method in accordance with an exemplary embodiment of the present disclosure.

In combination with the first aspect, in an implementation manner of the first aspect, the communication circuit is configured to transmit a first instruction to the mobile terminal, and the first instruction is configured to query the mobile terminal for whether to activate the quick charging mode, and the communication circuit is further configured to receive a reply instruction for the first instruction from the mobile terminal, and the reply instruction for the first instruction is configured to indicate that the mobile terminal agrees to activate the quick charging mode.

In combination with the first aspect or any of the above implementation manners, in another implementation manner of the first aspect, the power adapter further comprises a power conversion circuit configured to charge the mobile terminal in the normal charging mode. The communication circuit is configured to transmit the first instruction to the mobile terminal when it is determined that a time length of using the normal charging mode for charging is greater than a preset threshold.

In combination with the first aspect or any of the above implementation manners, in another implementation manner of the first aspect, the communication circuit is further configured to communicate with the mobile terminal via the data line of the USB interface to determine a charging voltage of the quick charging mode. The power adapter further comprises a voltage adjusting circuit configured to adjust a charging voltage of the power adapter to be the charging voltage of the quick charging mode.

In combination with the first aspect or any of the above implementation manners, in another implementation manner of the first aspect, the communication circuit is further configured to transmit a second instruction to the mobile terminal, and the second instruction is configured to query whether a current voltage of the power adapter is proper to be the charging voltage of the quick charging mode. The communication circuit is further configured to receive a reply instruction for the second instruction from the mobile terminal, and the reply instruction for the second instruction is configured to indicate that the current voltage of the power adapter is proper, high, or low. The voltage adjusting circuit is configured to determine the charging voltage of the quick charging mode according to the reply instruction for the second instruction.

In combination with the first aspect or any of the above implementation manners, in another implementation manner of the first aspect, the communication circuit is configured to communicate with the mobile terminal bidirectionally via the data line of the USB interface to determine the charging current of the quick charging mode. The communication circuit is configured to transmit a third instruction to the mobile terminal, and the third instruction is configured to query a maximum charging current which is currently supported by the mobile terminal. The communication circuit is further configured to receive a reply instruction for the third instruction from the mobile terminal, and the reply instruction for the third instruction is configured to indicate the maximum charging current which is currently supported by the mobile terminal. The communication circuit is further configured to determine the charging current of the quick charging mode according to the reply instruction for the third instruction.

In combination with the first aspect or any of the above implementation manners, in another implementation manner of the first aspect, the communication circuit is further configured to communicate with the mobile terminal bidirectionally via the data line of the USB interface during the process that the power adapter charges the mobile terminal in the quick charging mode to constantly adjust the charging current of the power adapter.

In combination with the first aspect or any of the above implementation manners, in another implementation manner of the first aspect, the communication circuit is configured to transmit a fourth instruction to the mobile terminal, and the fourth instruction is configured to query a current voltage of a battery of the mobile terminal. The communication circuit is further configured to receive a reply instruction for the fourth instruction from the mobile terminal, and the reply instruction for the fourth instruction is configured to indicate the current voltage of the battery of the mobile terminal. The current adjusting circuit is configured to adjust the charging current of the power adapter according to be the current voltage of the battery.

In combination with the first aspect or any of the above implementation manners, in another implementation manner of the first aspect, the current adjusting circuit is configured to adjust the charging current of the power adapter to be a charging current of the current voltage of the battery according to the current voltage of the battery, and a preset corresponding relationship between battery voltage values and charging current values.

In combination with the first aspect or any of the above implementation manners, in another implementation manner of the first aspect, the communication circuit is configured to receive information for indicating path impedance of the mobile terminal from the mobile terminal, receive a reply instruction for the fourth instruction from the mobile terminal, and the reply instruction for the fourth instruction is configured to indicate the voltage of the battery of the mobile terminal. The communication circuit is configured to determine path impedance from the power adapter to the battery according to the charging voltage of the power adapter and the voltage of the battery, and determine whether the USB interface is in bad contact according to the path impedance from the power adapter to the battery, the path impedance of the mobile terminal, and path impedance of a charging circuit between the power adapter and the mobile terminal.

In combination with the second aspect, in an implementation manner of the second aspect, the communication circuit is configured to receive a first instruction from the power adapter, and the first instruction is configured to query the mobile terminal for whether to activate the quick charging mode. The communication circuit is further configured to transmit a reply instruction for the first instruction to the power adapter, and the reply instruction for the first instruction is configured to indicate that the mobile terminal agrees to activate the quick charging mode.

In combination with the second aspect or any of the above implementation manners, in another implementation manner of the second aspect, the charging circuit is further configured to cause the power adapter to charge the mobile terminal in the normal charging mode. The communication circuit is configured to receive the first instruction from the power adapter when the power adapter determines that a time length of using the normal charging mode for charging is greater than a preset threshold.

In combination with the second aspect or any of the above implementation manners, in another implementation manner of the second aspect, the communication circuit is further configured to communicate with the power adapter bidirectionally via the data line of the USB interface to cause the power adapter to determine a charging voltage of the quick charging mode.

In combination with the second aspect or any of the above implementation manners, in another implementation manner of the second aspect, the communication circuit is configured to receive a second instruction from the power adapter, and the second instruction is configured to query whether a current voltage of the power adapter is proper to be the charging voltage of the quick charging mode. The communication circuit is further configured to transmit a reply instruction for the second instruction to the power adapter, and the reply instruction for the second instruction is configured to indicate that the current voltage of the power adapter is proper, high, or low.

In combination with the second aspect or any of the above implementation manners, in another implementation manner of the second aspect, the communication circuit is further configured to communicate with the power adapter bidirectionally via the data line of the USB interface to cause the power adapter to determine the charging current of the quick charging mode.

In combination with the second aspect or any of the above implementation manners, in another implementation manner of the second aspect, the communication circuit is configured to receive a third instruction from the power adapter, and the third instruction is configured to query a maximum charging current which is currently supported by the mobile terminal. The communication circuit is further configured to transmit a reply instruction for the third instruction to the power adapter, and the reply instruction for the third instruction is configured to indicate the maximum charging current which is currently supported by the mobile terminal, so as to cause the power adapter to determine the charging current of the quick charging mode according to the maximum charging current.

In combination with the second aspect or any of the above implementation manners, in another implementation manner of the second aspect, the communication circuit is further configured to communicate with the power adapter bidirectionally via the data line of the USB interface during the process that the power adapter charges the mobile terminal in the quick charging mode, so as to cause the power adapter to constantly adjust the charging current of the power adapter.

In combination with the second aspect or any of the above implementation manners, in another implementation manner of the second aspect, the communication circuit is configured to receive a fourth instruction from the power adapter, and the fourth instruction is configured to query the current voltage of the battery of the mobile terminal. The communication circuit is further configured to transmit a reply instruction for the fourth instruction to the power adapter, and the reply instruction for the fourth instruction is configured to indicate the current voltage of the battery of the mobile terminal, so as to cause the power adapter to constantly adjust the charging current of the power adapter according to the current voltage of the battery.

In combination with the second aspect or any of the above implementation manners, in another implementation manner of the second aspect, the communication circuit is further configured to communicate with the power adapter bidirectionally via the data line of the USB interface during the process that the power adapter charges the mobile terminal in the quick charging mode to cause the power adapter to determine whether the USB interface is in bad contact. The communication circuit is configured to receive a fourth instruction from the power adapter, and the fourth instruction is configured to query the current voltage of the battery of the mobile terminal; the communication circuit is further configured to transmit a reply instruction for the fourth instruction to the power adapter, and the reply instruction for the fourth instruction is configured to indicate the current voltage of the battery of the mobile terminal, so as to cause the power adapter to determine whether the USB interface is in bad contact according to the charging voltage of the power adapter and the current voltage of the battery.

In combination with the third aspect, in an implementation manner of the third aspect, the communication control circuit is configured to conduct a handshake communication with the mobile terminal via a first instruction to determine to activate the quick charging mode.

In combination with the third aspect or any of the above implementation manners, in another implementation manner of the third aspect, the communication control circuit is configured to transmit the first instruction to the mobile terminal, and the first instruction is configured to query the mobile terminal for whether to activate the quick charging mode. The communication control circuit is further configured to receive a reply instruction for the first instruction from the mobile terminal, and determine to activate the quick charging mode when the reply instruction for the first instruction indicates that the mobile terminal agrees to activate the quick charging mode.

In combination with the third aspect or any of the above implementation manners, in another implementation manner of the third aspect, the reply instruction for the first instruction comprises impedance information for indicating path impedance of the mobile terminal, and the impedance information is used for the power adapter to determine whether the USB interface is in bad contact during the constant current phase.

In combination with the third aspect or any of the above implementation manners, in another implementation manner of the third aspect, the communication control circuit is further configured to determine that the mobile terminal has recognized a type of the power adapter when the power adapter determines that within a preset time length a charging current provided to the mobile terminal by the power adapter is greater than or equal to a preset current threshold during a process that the power adapter is coupled to the mobile terminal, and transmit the first instruction to the mobile terminal when the power adapter determines that the mobile terminal has recognized the type of the power adapter.

In combination with the third aspect or any of the above implementation manners, in another implementation manner of the third aspect, the communication control circuit is further configured to repeat the above process of detecting the charging current and the handshake communication based on the first instruction until the mobile terminal agrees to activate the quick charging mode or the charging current is less than the preset current threshold when the reply instruction for the first instruction indicates that the mobile terminal disagrees to activate the quick charging mode.

In combination with the third aspect or any of the above implementation manners, in another implementation manner of the third aspect, the communication control circuit is configured to receive a query message from the mobile terminal, and the query message is configured to query whether the power adapter supports the quick charging mode. The communication control circuit is further configured to transmit a response message to mobile terminal, and the response message is configured to indicate that the power adapter supports the quick charging mode. The communication control circuit is further configured to receive an indication message from the mobile terminal, and the indication message is configured to instruct the power adapter to activate the quick charging mode.

In combination with the third aspect or any of the above implementation manners, in another implementation manner of the third aspect, the communication control circuit is configured to transmit a second instruction to the mobile terminal, and the second instruction is configured to query whether a current output voltage of the power adapter is proper to be the charging voltage of the quick charging mode. The communication control circuit is further configured to receive a reply instruction for the second instruction from the mobile terminal, and the reply instruction for the second instruction is configured to indicate that the current output voltage of the power adapter is proper, high, or low. The communication control circuit is further configured to determine the current output voltage of the power adapter as the charging voltage of the quick charging mode when the reply instruction for the second instruction indicates that the current output voltage of the power adapter is proper, and when the reply instruction for the second instruction indicates that the current output voltage of the power adapter is high or low, the communication control circuit is further configured to adjust the current output voltage of the power adapter according to the reply instruction for the second instruction, and repeat the handshake communication based on the second instruction to constantly adjust the current output voltage of the power adapter until the reply instruction for the second instruction indicates that the current output voltage of the power adapter is proper.

In combination with the third aspect or any of the above implementation manners, in another implementation manner of the third aspect, the communication control circuit is further configured to determine a time length of the handshake communication based on the second instruction, and when the time length is greater than a preset time length threshold, the communication control circuit is further configured to determine that the handshake communication based on the second instruction is abnormal, exit the handshake communication of the quick charging mode, or redetermine whether to activate the quick charging mode.

In combination with the third aspect or any of the above implementation manners, in another implementation manner of the third aspect, the communication control circuit is configured to transmit a third instruction to the mobile terminal, and the third instruction is configured to query a maximum charging current which is currently supported by the mobile terminal. The communication control circuit is further configured to receive a reply instruction for the third instruction from the mobile terminal, and the reply instruction for the third instruction is configured to indicate the maximum charging current which is currently supported by the mobile terminal. The communication control circuit is further configured to determine the charging current of the quick charging mode according to the reply instruction for the third instruction.

In combination with the third aspect or any of the above implementation manners, in another implementation manner of the third aspect, the communication control circuit is configured to adjust the output current of the power adapter to the charging current of the quick charging mode by controlling speed for adjusting current, and the speed for adjusting current is within a preset speed range for adjusting current.

In combination with the third aspect or any of the above implementation manners, in another implementation manner of the third aspect, the communication control circuit is configured to transmit the fourth instruction to the mobile terminal during the constant current phase, and the fourth instruction is configured to query a current voltage of a battery of the mobile terminal. The communication control circuit is further configured to receive a reply instruction for the fourth instruction from the mobile terminal, and the reply instruction for the fourth instruction is configured to indicate the current voltage of the battery of the mobile terminal. The communication control circuit is further configured to adjust the output current of the power adapter according to the current voltage of the battery.

In combination with the third aspect or any of the above implementation manners, in another implementation manner of the third aspect, the communication control circuit is configured to transmit the fourth instruction to the mobile terminal every a preset time interval during the constant current phase.

In combination with the third aspect or any of the above implementation manners, in another implementation manner of the third aspect, the communication control circuit is further configured to receive impedance information for indicating path impedance of the mobile terminal from the mobile terminal, determine an impedance of a charging circuit from the power adapter to the battery according to the current output voltage of the power adapter and the current voltage of the battery during the constant current phase, determine whether the USB interface is in bad contact according to the impedance of the charging circuit from the power adapter to the battery, the path impedance of the mobile terminal, and path impedance of a charging circuit between the power adapter and the mobile terminal, and exit the quick charging mode or redetermine whether to activate the quick charging mode when the USB interface is in bad contact.

In combination with the third aspect or any of the above implementation manners, in another implementation manner of the third aspect, the communication control circuit is further configured to transmit a fifth instruction to the mobile terminal when the USB interface is in bad contact, and the fifth instruction is configured to indicate that the USB interface is in bad contact and the power adapter is ready to exit the quick charging mode or redetermine whether to activate the quick charging mode.

In combination with the third aspect or any of the above implementation manners, in another implementation manner of the third aspect, during the constant current phase, a communication time interval between the power adapter and the mobile terminal is less than a preset time interval threshold, otherwise the power adapter exits the quick charging mode or redetermines whether to activate the quick charging mode.

In combination with the third aspect or any of the above implementation manners, in another implementation manner of the third aspect, stop of the quick charging mode comprises two stop modes: a recoverable stop mode and a non-recoverable stop mode. In the recoverable stop mode, the power adapter or the mobile terminal again activates the quick charging mode, and the power adapter again conducts the handshake communication with the mobile terminal. In the non-recoverable stop mode, the power adapter or the mobile terminal does not activate the quick charging mode again, and the power adapter charges the mobile terminal in the normal charging mode, or does not charge the mobile terminal again.

In combination with the third aspect or any of the above implementation manners, in another implementation manner of the third aspect, a condition suitable for the recoverable stop mode comprises: when a communication fault occurs between the power adapter and the mobile terminal, or the battery of the mobile terminal becomes abnormal, the quick charging mode is stopped, the power adapter requeries whether the mobile terminal agrees to activate the quick charging mode, and the mobile terminal agrees to again activate the quick charging mode. Or a condition for the non-recoverable stop mode comprises: when the battery of the mobile terminal is fully charged or the USB interface is in bad contact, the power adapter requeries the mobile terminal for whether to agree to activate the quick charging mode, and the mobile terminal disagrees to activate the quick charging mode.

In combination with the third aspect or any of the above implementation manners, in another implementation manner of the third aspect, the communication control circuit is further configured to determine whether the data line of the USB interface of the power adapter and the mobile terminal is the data line which is able to support the quick charging mode.

In combination with the third aspect or any of the above implementation manners, in another implementation manner of the third aspect, during the process of the communication between the power adapter and the mobile terminal, the power adapter is used as a host device to provide clock signal for synchronization between the power adapter and the mobile terminal.

In combination with the fourth aspect, in an implementation manner of the fourth aspect, the communication control circuit is configured to conduct a handshake communication with the power adapter via a first instruction to determine to activate the quick charging mode.

In combination with the fourth aspect or any of the above implementation manners, in another implementation manner of the fourth aspect, the communication control circuit is configured to receive the first instruction from the power adapter, and the first instruction is configured to query the mobile terminal for whether to activate the quick charging mode, and the communication control circuit is further configured to transmit a reply instruction for the first instruction to the power adapter, and the reply instruction for the first instruction is configured to indicate that the mobile terminal agrees to activate the quick charging mode.

In combination with the fourth aspect or any of the above implementation manners, in another implementation manner of the fourth aspect, the reply instruction for the first instruction comprises impedance information for indicating path impedance of the mobile terminal, and the impedance information is used for the power adapter to determine whether the USB interface is in bad contact during the constant current phase.

In combination with the fourth aspect or any of the above implementation manners, in another implementation manner of the fourth aspect, the communication control circuit is further configured to detect a type of the power adapter via a D+ data line and a D− data line of the USB interface during a process that the mobile terminal is coupled to the power adapter, and receive a charging current from the power adapter, and the charging current is greater than or equal to a preset current threshold. The communication control circuit is further configured to receive the first instruction from the power adapter when the power adapter determines that within a preset time length the charging current provided to the mobile terminal by the power adapter is greater than or equal to the preset current threshold.

In combination with the fourth aspect or any of the above implementation manners, in another implementation manner of the fourth aspect, the communication control circuit is configured to transmit a query message to the power adapter, and the query message is configured to query whether the power adapter supports the quick charging mode. The communication control circuit is further configured to receive a response message from the power adapter, and the response message is configured to indicate that the power adapter supports the quick charging mode. The communication control circuit is further configured to transmit an indication message to the power adapter, and the indication message is configured to instruct the power adapter to activate the quick charging mode.

In combination with the fourth aspect or any of the above implementation manners, in another implementation manner of the fourth aspect, the communication control circuit is configured to receive the second instruction from the power adapter, and the second instruction is configured to query whether a current output voltage of the power adapter is proper to be the charging voltage of the quick charging mode. The communication control circuit is further configured to transmit a reply instruction for the second instruction to the power adapter, and the reply instruction for the second instruction is configured to indicate that the current output voltage of the power adapter is proper, high, or low, so as to cause the power adapter to determine the charging voltage of the quick charging mode according to the reply instruction for the second instruction.

In combination with the fourth aspect or any of the above implementation manners, in another implementation manner of the fourth aspect, the communication control circuit is configured to transmit the reply instruction for the second instruction to the power adapter when the mobile terminal determines that the current output voltage of the power adapter is greater than the voltage of the battery of the mobile terminal and a voltage difference between the current output voltage of the power adapter and the voltage of the battery is within a preset voltage difference threshold range, and the reply instruction for the second instruction is configured to indicate that the current output voltage of the power adapter is proper.

In combination with the fourth aspect or any of the above implementation manners, in another implementation manner of the fourth aspect, the communication control circuit is further configured to determine a time length of the handshake communication based on the second instruction, and when the time length is greater than a preset time length threshold. The communication control circuit is further configured to determine that the handshake communication based on the second instruction is abnormal, exit the handshake communication of the quick charging mode, or redetermine whether to activate the quick charging mode.

In combination with the fourth aspect or any of the above implementation manners, in another implementation manner of the fourth aspect, the communication control circuit is configured to receive the third instruction from the power adapter, and the third instruction is configured to query a maximum charging current which is currently supported by the mobile terminal. The communication control circuit is further configured to transmit a reply instruction for the third instruction to the power adapter, and the reply instruction for the third instruction is configured to indicate the maximum charging current which is currently supported by the mobile terminal, so as to cause the power adapter to determine the charging current of the quick charging mode according to the reply instruction for the third instruction.

In combination with the fourth aspect or any of the above implementation manners, in another implementation manner of the fourth aspect, the communication control circuit is configured to receive the fourth instruction from the power adapter during the constant current phase, and the fourth instruction is configured to query the current voltage of the battery of the mobile terminal. The communication control circuit is configured to transmit a reply instruction for the fourth instruction to the power adapter, and the reply instruction for the fourth instruction is configured to indicate the current voltage of the battery of the mobile terminal, so as to cause the power adapter to adjust the output current of the power adapter according to the current voltage of the battery.

In combination with the fourth aspect or any of the above implementation manners, in another implementation manner of the fourth aspect, the communication control circuit is configured to receive the fourth instruction from the power adapter every a preset time interval during the constant current phase.

In combination with the fourth aspect or any of the above implementation manners, in another implementation manner of the fourth aspect, the communication control circuit is further configured to transmit information for indicating path impedance of the mobile terminal to the power adapter to cause the power adapter to determine whether the USB interface is in bad contact according to the path impedance during the constant current phase, receive a fifth instruction from the power adapter when the power adapter determines that USB interface is in bad contact, and the fifth instruction is configured to indicate that the USB interface is in bad contact, and the power adapter is ready to exit the quick charging mode or redetermine whether to activate the quick charging mode.

In combination with the fourth aspect or any of the above implementation manners, in another implementation manner of the fourth aspect, during the constant current phase, a communication time interval between the power adapter and the mobile terminal is less than a preset time interval threshold, otherwise the power adapter exits the quick charging mode or again activate the quick charging mode.

In combination with the fourth aspect or any of the above implementation manners, in another implementation manner of the fourth aspect, stop of the quick charging mode comprises two stop modes: a recoverable stop mode and a non-recoverable stop mode. In the recoverable stop mode, the power adapter or the mobile terminal again activates the quick charging mode, and the power adapter again conducts the handshake communication with the mobile terminal. In the non-recoverable stop mode, the power adapter or the mobile terminal does not activate the quick charging mode again, and the power adapter charges the mobile terminal in the normal charging mode, or does not charge the mobile terminal again.

In combination with the fourth aspect or any of the above implementation manners, in another implementation manner of the fourth aspect, a condition suitable for the recoverable stop mode comprises: when a communication fault occurs between the power adapter and the mobile terminal, or the battery of the mobile terminal becomes abnormal, the quick charging mode is stopped, the power adapter requeries the mobile terminal for whether to agree to activate the quick charging mode, and the mobile terminal agrees to again activate the quick charging mode. Or a condition suitable for the non-recoverable stop mode comprises: when the battery of the mobile terminal is fully charged or the USB interface is in bad contact, the power adapter requeries the mobile terminal for whether to agree to activate the quick charging mode, and the mobile terminal disagrees to activate the quick charging mode.

In combination with the fourth aspect or any of the above implementation manners, in another implementation manner of the fourth aspect, the communication control circuit is further configured to determine whether the data line of the USB interface of the power adapter and the mobile terminal is the data line which is able to support the quick charging mode.

In combination with the fourth aspect or any of the above implementation manners, in another implementation manner of the fourth aspect, during the process of the communication between the power adapter and the mobile terminal, the power adapter is used as a host device to provide clock signal for synchronization between the power adapter and the mobile terminal.

In embodiments of the present disclosure, the power adapter does not increase the charging current blindly for quick charging, but negotiates with the mobile terminal via the bidirectional communication with the mobile terminal to determine whether the quick charging mode can be adopted. Comparing with the present technology, the security of the quick charging process is improved.

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by those skilled in the art without creative work all fall within the protection scope of the present disclosure.

FIG. 1 is a schematic flow chart of an embodiment of a quick charging method of the present disclosure. The method of FIG. 1 is applied to a power adapter. The power adapter is coupled to a mobile terminal via a universal serial bus (USB) interface. The USB interface can be a normal USB interface, and can also be a micro USB interface. A power line of the USB interface is used for the power adapter to charge the mobile terminal, and the power line of the USB interface can be a bus voltage (VBus) line and/or ground line. A data line of the USB interface is used for a bidirectional communication between the power adapter and the mobile terminal. The data line can be a positive data (D+) line and/or a negative data (D−) line of the USB interface. The bidirectional communication can be an information interaction between the power adapter and the mobile terminal. The power adapter supports a normal charging mode and a quick charging mode, and a charging current in the quick charging mode is greater than a charging current in the normal charging mode (or, a charging speed in the quick charging mode is greater than a charging speed in the normal charging mode). Generally speaking, the normal charging mode can be understood to be a charging mode with a rated output voltage which is 5V and a rated output current which is less than or equal to 2.5 A. Additionally, in the normal charging mode, the output port D+ and D− of the power adapter can be shorted. However, the quick charging mode in the embodiments of the present disclosure is different, and in the quick charging mode in the embodiments of the present disclosure, the power adapter can communicate and exchange data with the mobile terminal via the D+ and D−. However, the embodiments of the present disclosure do not make specific limitations for the normal charging mode. If the power adapter supports two charging modes, and a charging speed (or current) in one of the two charging modes is greater than a charging speed (or current) in the other charging mode, the charging mode having a slower charging speed can be understood to be the normal charging mode.

The method of FIG. 1 includes the following:

110, the power adapter communicates with the mobile terminal bidirectionally via the data line of the USB interface, so as to determine to charge the mobile terminal in the quick charging mode.

It should be noted that, during a process that the power adapter negotiates with the mobile terminal to determine whether to charge the mobile terminal in the quick charging mode, the power adapter can be coupled to the mobile terminal but does not charge the mobile terminal, and the power adapter can also charge the mobile terminal in the normal charging mode, and can also charge the mobile terminal in a low current, and the embodiments of the present disclosure do not make specific limitations for this.

120, the power adapter adjusts a charging current of the power adapter to be/reach the charging current of the quick charging mode to charge the mobile terminal.

After the power adapter determines to charge the mobile terminal in the quick charging mode, the power adapter can directly adjust the charging current to be the rated charging current of the quick charging mode, or negotiate with the mobile terminal to determine a value of the charging current of the quick charging mode. For example, the power adapter determines the value of the charging current of the quick charging mode according to a current battery capacity of a battery of the mobile terminal.

In at least one embodiment, the power adapter does not increase the charging current blindly for quick charging, but negotiates with the mobile terminal via the bidirectional communication to determine whether the quick charging mode can be adopted.

Optionally, in one embodiment, block 110 can include: transmitting, by the power adapter, a first instruction to the mobile terminal, wherein the first instruction is configured to query the mobile terminal for whether to activate the quick charging mode; receiving, by the power adapter, a reply instruction for the first instruction from the mobile terminal, wherein the reply instruction is configured to indicate that the mobile terminal agrees to activate the quick charging mode.

Optionally, in one embodiment, before transmitting the first instruction to the mobile terminal by the power adapter, the method further includes: charging, by the power adapter, the mobile terminal in the normal charging mode. Transmitting the first instruction to the mobile terminal by the power adapter includes: transmitting, by the power adapter, the first instruction to the mobile terminal when the power adapter determines that a time length of using the normal charging mode for charging is greater than a preset threshold.

It can be understood that, when the power adapter determines the time length of using the normal charging mode for charging is greater than the preset threshold, the power adapter can determine that the terminal has recognized the power adapter, thus a quick charging query communication can be activated.

Optionally, in one embodiment, transmitting the first instruction to the mobile terminal by the power adapter includes: transmitting, by the power adapter, the first instruction to the mobile terminal when the power adapter determines that a charging current which is greater than or equal to a preset current threshold is used to charge the mobile terminal for a preset time length.

Optionally, in one embodiment, before step 120, the method of FIG. 1 can further include: communicating, by the power adapter, with the mobile terminal bidirectionally via the data line of the USB interface to determine a charging voltage of the quick charging mode; and adjusting, by the power adapter, charging voltage of the power adapter to be/reach the charging voltage of the quick charging mode.

Optionally, in one embodiment, block 110 can include: transmitting, by the power adapter, a second instruction to the mobile terminal, wherein the second instruction is configured to query whether a current voltage of the power adapter is proper to be the charging voltage of the quick charging mode; receiving, by the power adapter, a reply instruction for the second instruction from the mobile terminal, wherein the reply instruction for the second instruction is configured to indicate that the current voltage of the power adapter is proper, high, or low; and determining, by the power adapter, the charging voltage of the quick charging mode according to the reply instruction for the second instruction.

Optionally, in one embodiment, before step 120, the method of FIG. 1 can further include: communicating, by the power adapter, with the mobile terminal bidirectionally via the data line of the USB interface to determine the charging current of the quick charging mode.

Optionally, in one embodiment, communicating, by the power adapter, with the mobile terminal bidirectionally via the data line of the USB interface to determine the charging current of the quick charging mode can include: transmitting, by the power adapter, a third instruction to the mobile terminal, wherein the third instruction is configured to query a maximum charging current which is currently supported by the mobile terminal; receiving, by the power adapter, a reply instruction for the third instruction from the mobile terminal, wherein the reply instruction for the third instruction is configured to indicate the maximum charging current which is currently supported by the mobile terminal; and determining, by the power adapter, the charging current of the quick charging mode according to the reply instruction for the third instruction.

The power adapter can directly determine the maximum charging current as the charging current of the quick charging mode, or set the charging current of the quick charging mode to be a certain current value which is less than the maximum charging current.

Optionally, in one embodiment, the method of FIG. 1 can further include: communicating, by the power adapter, with the mobile terminal bidirectionally via the data line of the USB interface during the process that the power adapter charges the mobile terminal in the quick charging mode to constantly adjust the charging current of the power adapter.

The power adapter can constantly query a current work status of the mobile terminal, for example, a voltage of the mobile terminal, a battery capacity of the mobile terminal, and so on, so as to constantly adjust the charging current.

Optionally, in one embodiment, communicating, by the power adapter, with the mobile terminal bidirectionally via the data line of the USB interface to constantly adjust the charging current of the power adapter can include: transmitting, by the power adapter, a fourth instruction to the mobile terminal, wherein the fourth instruction is configured to query a current voltage of a battery of the mobile terminal; receiving, by the power adapter, a reply instruction for the fourth instruction from the mobile terminal, wherein the reply instruction for the fourth instruction is configured to indicate the current voltage of the battery of the mobile terminal; and adjusting, by the power adapter, the charging current of the power adapter according to the current voltage of the battery.

Optionally, in one embodiment, adjusting, by the power adapter, the charging current according to the current voltage of the battery includes: adjusting, by the power adapter, the charging current of the power adapter to be a charging current of the current voltage of the battery according to the current voltage of the battery, and a preset corresponding relationship between battery voltage values and charging current values.

Specifically, the power adapter can store the preset corresponding relationship between battery voltage values and charging current values in advance.

Optionally, in one embodiment, the method of FIG. 1 can further include: communicating, by the power adapter, with the mobile terminal bidirectionally via the data line of the USB interface during the process that the power adapter charges the mobile terminal in the quick charging mode to determine whether the USB interface is in bad contact; and exiting, by the power adapter, the quick charging mode when it is determined that the USB interface is in bad contact.

Optionally, in one embodiment, before the power adapter communicating with the mobile terminal bidirectionally via the data line of the USB interface to determine whether the USB interface is in bad contact, the method of FIG. 1 can further include: receiving, by the power adapter, information for indicating path impedance of the mobile terminal from the mobile terminal. Communicating, by the power adapter, with the mobile terminal bidirectionally via the data line of the USB interface to determine whether the USB interface is in bad contact includes: transmitting, by the power adapter, a fourth instruction to the mobile terminal, wherein the fourth instruction is configured to query the voltage of the battery of the mobile terminal; receiving, by the power adapter, a reply instruction for the fourth instruction from the mobile terminal, wherein the reply instruction for the fourth instruction is configured to indicate the voltage of the battery of the mobile terminal; determining, by the power adapter, path impedance from the power adapter to the battery according to the charging voltage of the power adapter and the voltage of the battery; and determining, by the power adapter, whether the USB interface is in bad contact according to the path impedance from the power adapter to the battery, the path impedance of the mobile terminal, and path impedance of a charging circuit between the power adapter and the mobile terminal.

The mobile terminal can record the path impedance 1 of the mobile terminal in advance. For example, mobile terminals of the same model have the same structure. When setting factory settings, the mobile terminals are set to have the same path impedance. Similarly, the power adapter can record the path impedance 2 of the charging circuit in advance. When the power adapter obtains the voltage of the battery of the mobile terminal, the path impedance 3 of the whole path can be determined according to the voltage of the battery of the power adapter. When the path impedance 3 is greater than a sum of the path impedance 1 and the path impedance 2, or when a value of the path impedance 3 minus the sum of the path impedance 1 and the path impedance 2 is greater than an impedance threshold, the power adapter determines that the USB interface is in bad contact.

Optionally, in one embodiment, before exiting the quick charging mode by the power adapter, the method of FIG. 1 can further include: transmitting, by the power adapter, a fifth instruction to the mobile terminal, wherein the fifth instruction is configured to indicate that the USB interface is in bad contact.

After transmitting the fifth instruction, the power adapter can exit the quick charging mode or reset.

The above specifically describes the quick charging method of the embodiments of the present disclosure executed by the power adapter in combination with FIG. 1. The following will specifically describe the quick charging method of the embodiments of the present disclosure executed by the mobile terminal in combination with FIG. 2.

It can be understood that interaction and relevance properties and functions of the power adapter and the mobile terminal described in the quick charging method executed by the mobile terminal corresponds to the description of the quick charging method executed by the power adapter. For simplicity, repeated description will be omitted appropriately.

Figure 2:
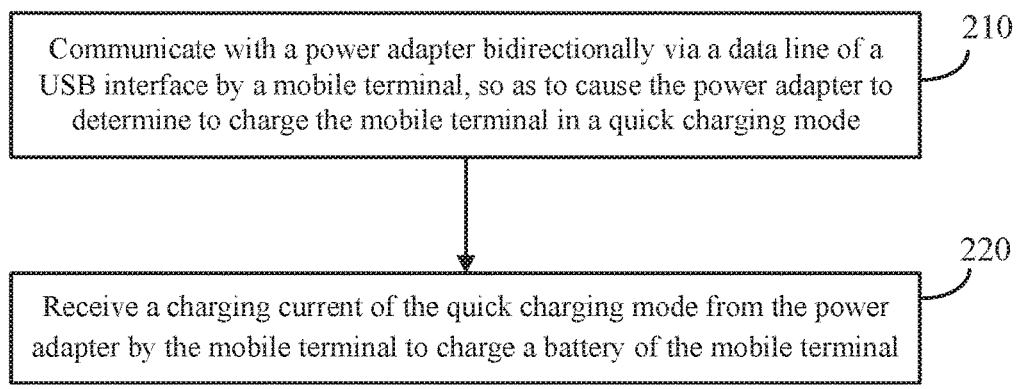
FIG. 2 is a schematic flow chart of a quick charging method in accordance with an exemplary embodiment of the present disclosure.

FIG. 2 is a schematic flow chart of a quick charging method in accordance with an exemplary embodiment of the present disclosure. The method of FIG. 2 is applied to a mobile terminal. The mobile terminal is coupled to a power adapter via a USB interface. A power line of the USB interface is used for charging the mobile terminal. A data line of the USB interface is used for a bidirectional communication between the mobile terminal and the power adapter. The mobile terminal supports a normal charging mode and a quick charging mode, and a charging current of the quick charging mode is greater than a charging current of the normal charging mode. The method of FIG. 2 includes the following.

210, the mobile terminal communicates with the power adapter bidirectionally via the data line of the USB interface, so as to cause the power adapter to determine to charge the mobile terminal in the quick charging mode.

220, the mobile terminal receives the charging current of the quick charging mode from the power adapter to charge a battery of the mobile terminal.

In at least one embodiment, the power adapter does not increase the charging current blindly for quick charging, but negotiates with the mobile terminal via the bidirectional communication with the mobile terminal to determine whether the quick charging mode can be adopted.

Optionally, in one embodiment, communicating, by the mobile terminal, with the power adapter bidirectionally via the data line of the USB interface to cause the power adapter to determine to charge the mobile terminal in the quick charging mode includes: receiving, by the mobile terminal, a first instruction from the power adapter, wherein the first instruction is configured to query the mobile terminal for whether to activate the quick charging mode; transmitting, by the mobile terminal, a reply instruction for the first instruction to the power adapter, wherein the reply instruction for the first instruction is configured to indicate that the mobile terminal agrees to activate the quick charging mode.

Optionally, in one embodiment, before receiving the first instruction from the power adapter by the mobile terminal, the method further includes: causing, by the mobile terminal, the power adapter to charge the mobile terminal in the normal charging mode. Receiving, by the mobile terminal, the first instruction from the power adapter includes: receiving, by the power adapter, the first instruction from the power adapter when the power adapter determines that a time length of using the normal charging mode for charging is greater than a preset threshold.

Optionally, in one embodiment, before receiving, by the mobile terminal, the charging current of the quick charging mode from the power adapter to charge a battery of the mobile terminal, the method further includes: communicating, by the mobile terminal, with the power adapter bidirectionally via the data line of the USB interface to cause the power adapter to determine a charging voltage of the quick charging mode.

Optionally, in one embodiment, communicating, by the mobile terminal, with the power adapter bidirectionally via the data line of the USB interface to cause the power adapter to determine the charging voltage of the quick charging mode includes: receiving, by the mobile terminal, a second instruction from the power adapter, wherein the second instruction is configured to query whether a current voltage of the power adapter is proper to be the charging voltage of the quick charging mode; and transmitting, by the mobile terminal, a reply instruction for the second instruction to the power adapter, wherein the reply instruction for the second instruction is configured to indicate that the current voltage of the power adapter is proper, high, or low.

Optionally, in one embodiment, before receiving, by the mobile terminal, the charging current of the quick charging mode from the power adapter to charge the battery of the mobile terminal, the method further includes: communicating, by the mobile terminal, with the power adapter bidirectionally via the data line of the USB interface to cause the power adapter to determine the charging current of the quick charging mode.

Optionally, in one embodiment, communicating, by the mobile terminal, with the power adapter bidirectionally via the data line of the USB interface to cause the power adapter to determine the charging current of the quick charging mode includes: receiving, by the mobile terminal, a third instruction from the power adapter, wherein the third instruction is configured to query a maximum charging current which is currently supported by the mobile terminal; and transmitting, by the mobile terminal, a reply instruction for the third instruction to the power adapter, wherein the reply instruction for the third instruction is configured to indicate the maximum charging current which is currently supported by the mobile terminal, so as to cause the power adapter to determine the charging current of the quick charging mode according to the maximum charging current.

Optionally, in one embodiment, the method further includes: communicating, by the mobile terminal, with the power adapter bidirectionally via the data line of the USB interface during the process that the power adapter charges the mobile terminal in the quick charging mode, so as to cause the power adapter to constantly adjust the charging current of the power adapter.

Optionally, in one embodiment, communicating, by the mobile terminal, with the power adapter bidirectionally via the data line of the USB interface to cause the power adapter to constantly adjust the charging current of the power adapter includes: receiving, by the mobile terminal, a fourth instruction from the power adapter, wherein the fourth instruction is configured to query the current voltage of the battery of the mobile terminal; and transmitting, by the mobile terminal, a reply instruction for the fourth instruction to the power adapter, wherein the reply instruction for the fourth instruction is configured to indicate the current voltage of the battery of the mobile terminal, so as to cause the power adapter to constantly adjust the charging current of the power adapter according to the current voltage of the battery.

Optionally, in one embodiment, the method further includes: communicating, by the mobile terminal, with the power adapter bidirectionally via the data line of the USB interface during the process that the power adapter charges the mobile terminal in the quick charging mode to cause the power adapter to determine whether the USB interface is in bad contact.

Optionally, in one embodiment, communicating, by the mobile terminal, with the power adapter bidirectionally via the data line of the USB interface to cause the power adapter to determine whether the USB interface is in bad contact includes: receiving, by the mobile terminal, a fourth instruction from the power adapter, wherein the fourth instruction is configured to query the current voltage of the battery of the mobile terminal; and transmitting, by the mobile terminal, a reply instruction for the fourth instruction to the power adapter, wherein the reply instruction for the fourth instruction is configured to indicate the current voltage of the battery of the mobile terminal, so as to cause the power adapter to determine whether the USB interface is in bad contact according to the charging voltage of the power adapter and the current voltage of the battery.

Optionally, in one embodiment, the method further includes: receiving, by the mobile terminal, a fifth instruction to the power adapter, wherein the fifth instruction is configured to indicate that the USB interface is in bad contact.

The following will describe embodiments of the present disclosure more specifically in combination with detailed examples. It should be noted that examples of FIGS. 3-4 are just used to help those skilled in the art to understand the embodiments of the present disclosure, and not used to limit the embodiments of the present disclosure to detailed values or detailed scenarios which are shown in the examples.

Figure 3:
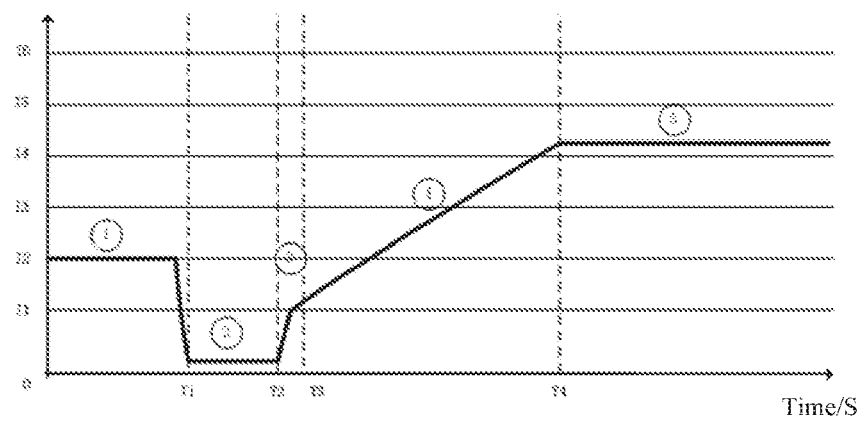
FIG. 3 is a schematic view showing a process of activating quick charging in accordance with an exemplary embodiment of the present disclosure.
Figure 4:
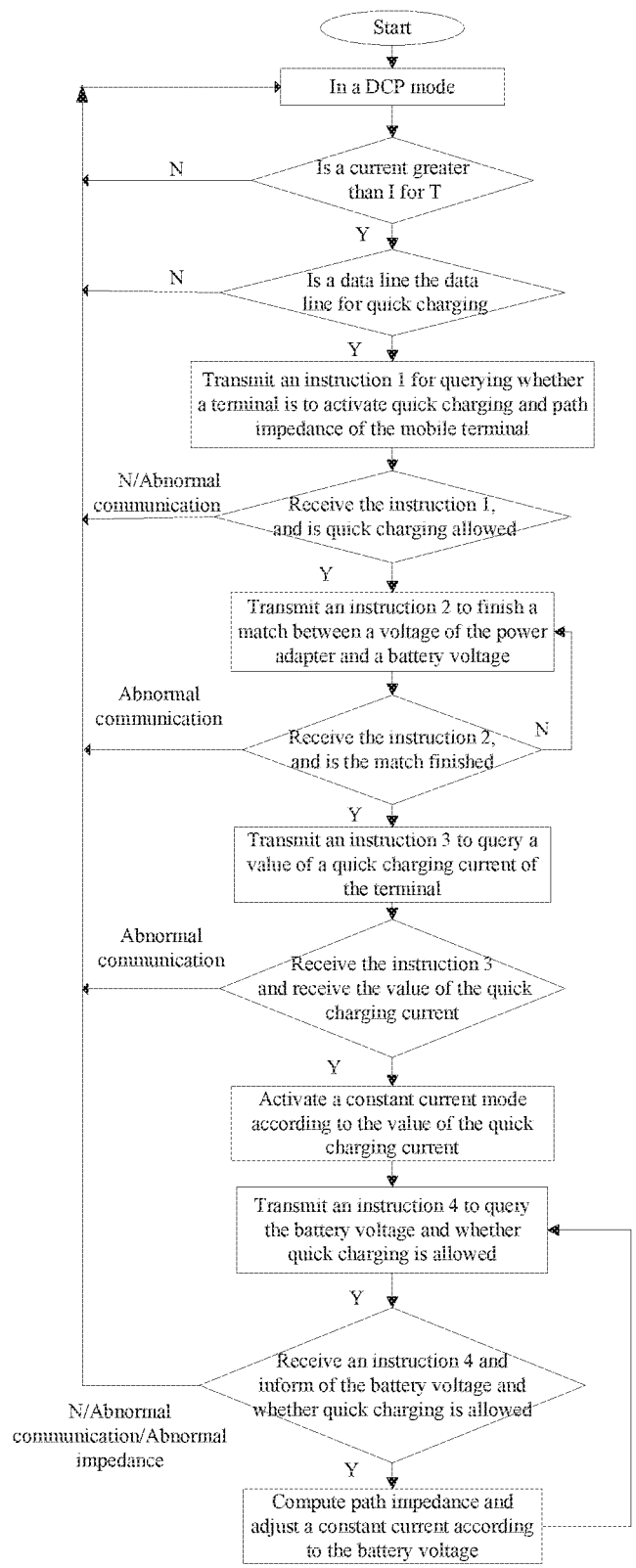
FIG. 4 is a schematic view showing a quick charging process in accordance with an exemplary embodiment of the present disclosure.

Apparently, those skilled in the art can make various equivalent modification or change according to the examples shown in FIGS. 3-4, and such modification or change shall fall within the scope of the embodiments of the present disclosure.

FIG. 3 is a schematic view showing a process of activating quick charging in accordance with an exemplary embodiment of the present disclosure.

Phase 1:

The mobile terminal can detect a type of the mobile terminal via the D+ and D−. When it is detected that the power adapter is a charging device of non-USB type, a current absorbed by the mobile terminal can be greater than a preset current threshold I2. When the power adapter determines that within a preset time length (for example, continuous T1 time length) the output current of the power adapter is greater than or equal to I2, the power adapter determines that the mobile terminal has recognized the type of the power adapter, and the power adapter activates a handshake communication between the power adapter and the mobile terminal. The power adapter transmits an instruction 1 (corresponding to the first instruction) to query whether the mobile terminal is to activate the quick charging mode (also known as flash charging mode).

When the reply instruction received from the mobile terminal by the power adapter indicates that the mobile terminal disagrees to activate the quick charging mode, the power adapter again detects the output current of the power adapter. When the output current of the power adapter is still greater than or equal to I2, the power adapter again transmits the request to query whether the mobile terminal is to activate the quick charging mode, and the above steps of the phase 1 are repeated until the mobile terminal agrees to activate the quick charging mode or the output current of the power adapter is no longer greater than or equal to I2.

When the mobile terminal agrees to activate quick charging, the quick charging process is activated, and the quick charging communication process enters a phase 2.

Phase 2

The power adapter can output different voltage level. The power adapter transmits an instruction 2 (corresponding to the second instruction) to query the mobile terminal for whether the output voltage of the power adapter is proper (that is, whether the output voltage is proper to be the charging voltage of the quick charging mode).

The mobile terminal sends a reply to the power adapter to inform the power adapter that the output voltage of the power adapter is high, low, or proper. If the reply the power adapter received from the mobile terminal indicates that the output voltage of the power adapter is high or low, the power adapter selects another output voltage level, and resends the instruction 2 to the mobile terminal to requery the mobile terminal for whether the output voltage of the power adapter is proper.

The above steps of the phase 2 are repeated until the mobile terminal returns a reply to the power adapter to inform the power adapter that the output voltage of the power adapter is proper, and the quick charging communication process enters a phase 3.

Phase 3

When the power adapter receives a reply for indicating that the output voltage of the power adapter is proper from the mobile terminal, the power adapter transmits an instruction 3 (corresponding to the third instruction) to the mobile terminal to query a maximum charging current which is currently supported by the mobile terminal. The mobile terminal transmits a reply to inform the power adapter of the maximum charging current which is currently supported by the mobile terminal, and the quick charging communication process enters a phase 4.

Phase 4

When the power adapter receives a reply for indicating the maximum charging current which is currently supported by the mobile terminal from the mobile terminal, the power adapter sets the output current of the power adapter to be a specified value, outputs the output current, and enters a constant current phase.

Phase 5

After entering the constant current phase, the power adapter transmits an instruction 4 (corresponding to the fourth instruction) every a time interval to query the current voltage of the battery of the mobile terminal. The mobile terminal can transmit a reply to inform the power adapter of the current voltage of the battery of the mobile terminal. The power adapter can determine whether the USB interface is in good contact and whether it is need to decrease the current charging current value of the mobile terminal according to the reply for indicating the current voltage of the battery of the mobile terminal. When the power adapter determines that the USB interface is in bad contact, the power adapter transmits an instruction 5 (corresponding to the fifth instruction), and then resets to enter the phase 1 again.

Optionally, in one embodiment, in the phase 1, when the mobile terminal returns the instruction 1, the instruction 1 can carry a data (or information) for indicating the path impedance of the mobile terminal. The data for indicating the path impedance of the mobile terminal can be configured to determine whether USB contact is bad in the phase 5.

Optionally, in one embodiment, in the phase 2, the time interval from the time point that the mobile terminal agrees to activate the quick charging mode to the time point that the power adapter adjusts the voltage of the power adapter to be a proper value can be set to be within a preset range. When the time interval does not fall within the preset range, the mobile terminal determines that the request is abnormal, and resets quick charging.

Optionally, in one embodiment, in the phase 2, when the output voltage of the power adapter is adjusted to be $\Delta V$ ($\Delta V$ falls within 200~500 mV) higher than the current voltage of the battery, the mobile terminal transmits a reply to the power adapter to inform the power adapter that the output voltage of the power adapter is proper.

Optionally, in one embodiment, in the phase 4, speed for adjusting the output current of the power adapter can be controlled to be within a preset range, which can avoid abnormal interruption caused by frequently adjusting the output current.

Optionally, in one embodiment, in the phase 5, in the constant current phase, a change range of the output current of the power adapter can be controlled to be within 0~5%.

Optionally, in one embodiment, in the phase 5, the power adapter monitors the impedance of the charging circuit in time, that is, the power adapter monitors the impedance of the whole charging circuit by measuring the output voltage of the power adapter and the current charging current, and the obtained voltage of the battery of the mobile terminal. When it is determined that the impedance of the charging circuit is greater than a sum of the path impedance of the mobile terminal and the impedance of the data line for quick charging, the USB contact is determined to be bad, and quick charging is reset.

Optionally, in one embodiment, after activating the quick charging mode, the communication time interval between the power adapter and the mobile terminal can be controlled to be within a preset range to avoid quick charging resetting.

Optionally, in one embodiment, stop of the quick charging mode (or the quick charging process) can include recoverable stop and non-recoverable stop.

For example, when the mobile terminal determines that the battery is fully charged or the USB contact is bad, quick charging stops and resets to enter the phase 1, that is, the mobile terminal does not agree to activate the quick charging mode, and the quick charging process does not enter the phase 2. Under this condition, the stop of the quick charging process can be recognized as the non-recoverable stop.

For example, when a communication fault occurs between the mobile terminal and the power adapter, quick charging stops and resets to enter the phase 1. When the requirement of the phase 1 is satisfied, the mobile terminal agrees to activate the quick charging mode to recover the quick charging process. Under this condition, the stop of the quick charging process can be recognized as the recoverable stop.

For example, when the mobile terminal determines that the battery becomes abnormal, quick charging stops and resets to enter the phase 1. After entering the phase 1, the mobile terminal disagrees to activate the quick charging mode. When the battery becomes normal and the requirement of the phase 1 is satisfied, the mobile terminal agrees to activate quick charging to recover the quick charging process. Under this condition, the stop of the quick charging process can be recognized as the recoverable stop.

The following will give an example of the quick charging process in conjunction with FIG. 4. The whole process of FIG. 4 corresponds to that of FIG. 3.

From FIG. 4, it can be seen that the power adapter is in a DCP mode at the beginning, that is, in a short mode in which the D+ and D− are shorted, and the power adapter charges the mobile terminal in the normal charging mode. Before transmitting the first instruction, the power adapter can further determine whether the data line is the data line for quick charging. There are a number of methods to make a determination. For example, an identifier circuit is added to the data line. The power adapter interacts with the identifier circuit to determine whether the data line is the data line for quick charging. Additionally, what is needed to be pointed out is that in the whole quick charging process, when a communication fault or an impedance fault occurs, the power adapter can exit the quick charging process or reset.

In combination with FIGS. 1-4, the above specifically describes the quick charging method of the embodiments of the present disclosure. In combination with FIGS. 5-8, the following will specifically describe the power adapter and the mobile terminal of the embodiments of the present disclosure.

Figure 5:
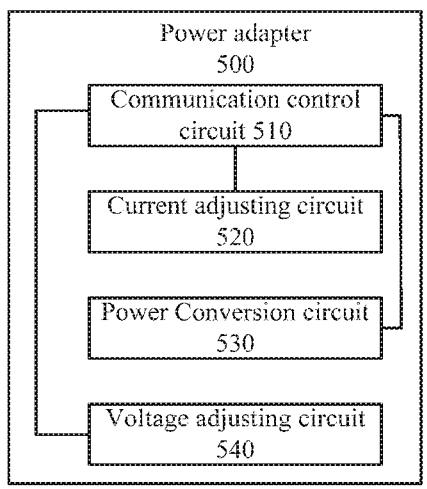
FIG. 5 is a schematic structural diagram of a power adapter in accordance with an exemplary embodiment of the present disclosure.

FIG. 5 is a schematic structure diagram of a power adapter in accordance with an exemplary embodiment of the present disclosure. A power adapter 500 of FIG. 5 can implement various steps executed by the power adapter of FIGS. 1-4. To avoid repetition, detailed description will be omitted.

Specifically, the power adapter 500 is coupled to a mobile terminal via a USB interface. A power line of the USB interface is used for the power adapter 500 to charge the mobile terminal. A data line of the USB interface is used for a bidirectional communication between the power adapter 500 and the mobile terminal. The power adapter 500 supports a normal charging mode and a quick charging mode, and a charging current of the quick charging mode is greater than a charging current of the normal charging mode. The power adapter 500 includes the following.

A communication circuit 510 is configured to communicate with the mobile terminal bidirectionally via the data line of the USB interface, so as to determine to charge the mobile terminal in the quick charging mode.

A current adjusting circuit 520 is configured to adjust a charging current of the power adapter to be the charging current of the quick charging mode to charge the mobile terminal.

In at least one embodiment, the power adapter does not increase the charging current blindly for quick charging, but negotiates with the mobile terminal via the bidirectional communication with the mobile terminal to determine whether the quick charging mode can be adopted.

Optionally, in one embodiment, the communication circuit 510 is configured to transmit a first instruction to the mobile terminal, and the first instruction is configured to query the mobile terminal for whether to activate the quick charging mode. The communication circuit 510 is further configured to receive a reply instruction for the first instruction from the mobile terminal, and the reply instruction for the first instruction is configured to indicate that the mobile terminal agrees to activate the quick charging mode.

Optionally, in one embodiment, the power adapter 500 further includes a power conversion circuit 530 configured to charge the mobile terminal in the normal charging mode. The communication circuit 510 is configured to transmit the first instruction to the mobile terminal when it is determined that a time length of using the normal charging mode for charging is greater than a preset threshold.

Optionally, in one embodiment, the communication circuit 510 is further configured to communicate with the mobile terminal bidirectionally via the data line of the USB interface to determine a charging voltage of the quick charging mode. The power adapter 500 further includes a voltage adjusting circuit 540 configured to adjust a charging voltage of the power adapter 500 to be the charging voltage of the quick charging mode.

Optionally, in one embodiment, the communication circuit 510 is further configured to transmit a second instruction to the mobile terminal, and the second instruction is configured to query whether a current voltage of the power adapter 500 is proper to be the charging voltage of the quick charging mode. The communication circuit 510 is further configured to receive a reply instruction for the second instruction from the mobile terminal, and the reply instruction for the second instruction is configured to indicate that the current voltage of the power adapter is proper, high, or low. The voltage adjusting circuit is configured to determine the charging voltage of the quick charging mode according to the reply instruction for the second instruction.

Optionally, in one embodiment, the communication circuit 510 is configured to communication with the mobile terminal bidirectionally via the data line of the USB interface to determine the charging current of the quick charging mode.

Optionally, in one embodiment, the communication circuit 510 is configured to transmit a third instruction to the mobile terminal, and the third instruction is configured to query a maximum charging current which is currently supported by the mobile terminal. The communication circuit 510 is further configured to receive a reply instruction for the third instruction from the mobile terminal, and the reply instruction for the third instruction is configured to indicate the maximum charging current which is currently supported by the mobile terminal. The communication circuit 510 is configured to determine the charging current of the quick charging mode according to the reply instruction for the third instruction.

Optionally, in one embodiment, the communication circuit 510 is further configured to communicate with the mobile terminal bidirectionally via the data line of the USB interface during the process that the power adapter 500 charges the mobile terminal in the quick charging mode to constantly adjust the charging current of the power adapter.

Optionally, in one embodiment, the communication circuit 510 is configured to transmit a fourth instruction to the mobile terminal, and the fourth instruction is configured to query a current voltage of a battery of the mobile terminal. The communication circuit 510 is further configured to receive a reply instruction for the fourth instruction from the mobile terminal, and the reply instruction for the fourth instruction is configured to indicate the current voltage of the battery of the mobile terminal. The current adjusting circuit 520 is configured to adjust the charging current of the power adapter 500 according to the current voltage of the battery.

Optionally, in one embodiment, the current adjusting circuit 520 is configured to adjust the charging current of the power adapter 500 to be a charging current of the current voltage of the battery according to the current voltage of the battery, and a preset corresponding relationship between battery voltage values and charging current values.

Optionally, in one embodiment, the communication circuit 510 is further configured to communicate with the mobile terminal bidirectionally via the data line of the USB interface during the process that the power adapter 500 charges the mobile terminal in the quick charging mode to determine whether the USB interface is in bad contact. The communication circuit 510 is further configured to exit the quick charging mode when it is determined that the USB interface is in bad contact.

Optionally, in one embodiment, the communication circuit 510 is configured to receive information for indicating path impedance of the mobile terminal from the mobile terminal, receive a reply instruction for the fourth instruction from the mobile terminal, and the reply instruction for the fourth instruction is configured to indicate the voltage of the battery of the mobile terminal. The communication circuit 510 is further configured to determine path impedance from the power adapter 500 to the battery according to the charging voltage of the power adapter 500 and the voltage of the battery, and determine whether the USB interface is in bad contact according to the path impedance from the power adapter 500 to the battery, the path impedance of the mobile terminal, and path impedance of a charging circuit between the power adapter 500 and the mobile terminal.

Optionally, in one embodiment, the communication circuit 510 is further configured to transmit a fifth instruction to the mobile terminal, and the fifth instruction is configured to indicate that the USB interface is in bad contact.

Figure 6:
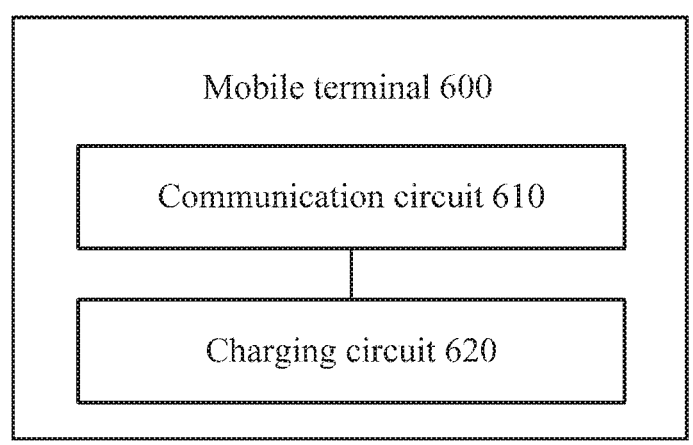
FIG. 6 is a schematic structural diagram of a mobile terminal in accordance with an exemplary embodiment of the present disclosure.

FIG. 6 is a schematic block diagram of a mobile terminal in accordance with an exemplary embodiment of the present disclosure. A mobile terminal 600 of FIG. 6 is coupled to a power adapter via a USB interface. A power line of the USB interface is used for charging the mobile terminal 600. A data line of the USB interface is used for a bidirectional communication between the mobile terminal 600 and the power adapter. The mobile terminal 600 supports a normal charging mode and a quick charging mode, and a charging current of the quick charging mode is greater than a charging current of the normal charging mode. The mobile terminal 600 includes the following.

A communication circuit 610 is configured to communicate with the power adapter bidirectionally via the data line of the USB interface, so as to cause the power adapter to determine to charge the mobile terminal 600 in the quick charging mode.

A charging circuit 620 is configured to receive the charging current of the quick charging mode from the power adapter to charge the mobile terminal.

In at least one embodiment, the power adapter does not increase the charging current blindly for quick charging, but negotiates with the mobile terminal via the bidirectional communication with the mobile terminal to determine whether the quick charging mode can be adopted.

Optionally, in one embodiment, the communication circuit 610 is configured to receive a first instruction from the power adapter, and the first instruction is configured to query the mobile terminal 600 for whether to activate the quick charging mode. The communication circuit 610 is further configured to transmit a reply instruction for the first instruction to the power adapter, and the reply instruction for the first instruction is configured to indicate that the mobile terminal 600 agrees to activate the quick charging mode.

Optionally, in one embodiment, the charging circuit 620 is further configured to cause the power adapter to charge the mobile terminal 600 in the normal charging mode. The communication circuit 610 is configured to receive the first instruction from the power adapter when the power adapter determines that a time length of using the normal charging mode for charging is greater than a preset threshold.

Optionally, in one embodiment, the communication circuit 610 is further configured to communicate with the power adapter bidirectionally via the data line of the USB interface to cause the power adapter to determine a charging voltage of the quick charging mode.

Optionally, in one embodiment, the communication circuit 610 is configured to receive a second instruction from the power adapter, and the second instruction is configured to query whether a current voltage of the power adapter is proper to be the charging voltage of the quick charging mode. The communication circuit 610 is further configured to transmit a reply instruction for the second instruction to the power adapter, and the reply instruction for the second instruction is configured to indicate that the current voltage of the power adapter is proper, high, or low.

Optionally, in one embodiment, the communication circuit 610 is further configured to communicate with the power adapter bidirectionally via the data line of the USB interface to cause the power adapter to determine the charging current of the quick charging mode.

Optionally, in one embodiment, the communication circuit 610 is configured to receive a third instruction from the power adapter, and the third instruction is configured to query a maximum charging current which is currently supported by the mobile terminal 600. The communication circuit 610 is further configured to transmit a reply instruction for the third instruction to the power adapter, and the reply instruction for the third instruction is configured to indicate the maximum charging current which is currently supported by the mobile terminal 600, so as to cause the power adapter to determine the charging current of the quick charging mode according to the maximum charging current.

Optionally, in one embodiment, the communication circuit 610 is further configured to communicate with the power adapter bidirectionally via the data line of the USB interface during the process that the power adapter charges the mobile terminal 600 in the quick charging mode, so as to cause the power adapter to constantly adjust the charging current of the power adapter.

Optionally, in one embodiment, the communication circuit 610 is configured to receive a fourth instruction from the power adapter, and the fourth instruction is configured to query the current voltage of the battery of the mobile terminal 600. The communication circuit 610 is further configured to transmit a reply instruction for the fourth instruction to the power adapter, and the reply instruction for the fourth instruction is configured to indicate the current voltage of the battery of the mobile terminal 600, so as to cause the power adapter to constantly adjust the charging current of the power adapter according to the current voltage of the battery.

Optionally, in one embodiment, the communication circuit 610 is further configured to communicate with the power adapter bidirectionally via the data line of the USB interface during the process that the power adapter charges the mobile terminal 600 in the quick charging mode, so as to cause the power adapter to determine whether the USB interface is in bad contact.

Optionally, in one embodiment, the communication circuit 610 is configured to receive the fourth instruction from the power adapter, and the fourth instruction is configured to query the current voltage of the battery of the mobile terminal 600. The communication circuit 610 is further configured to transmit the reply instruction for the fourth instruction to the power adapter, and the reply instruction for the fourth instruction is configured to indicate the current voltage of the battery of the mobile terminal 600, so as to cause the power adapter to determine whether the USB interface is in bad contact according to the charging voltage of the power adapter and the current voltage of the battery.

Optionally, in one embodiment, the communication circuit 610 is further configured to receive a fifth instruction from the power adapter, and the fifth instruction is configured to indicate that the USB interface is in bad contact.

Figure 7:
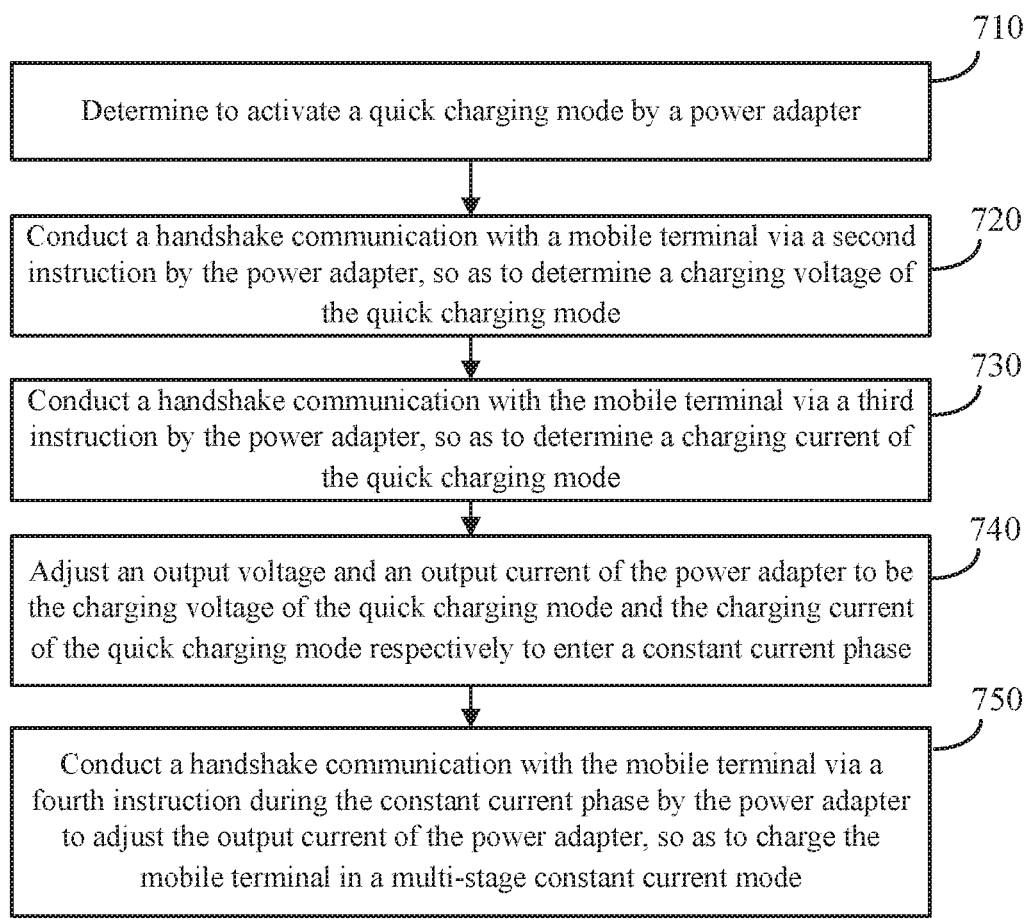
FIG. 7 is a schematic flow chart of a quick charging method in accordance with an exemplary embodiment of the present disclosure.

FIG. 7 is a schematic flow chart of a quick charging method in accordance with an exemplary embodiment of the present disclosure. The method of FIG. 7 is applied to a power adapter. The power adapter is coupled to a mobile terminal via a USB interface. A power line of the USB interface is used for the power adapter to charge the mobile terminal. A data line of the USB interface is used for a bidirectional communication between the power adapter and the mobile terminal. The power adapter supports a normal charging mode and a quick charging mode, and a charging current of the quick charging mode is greater than a charging current of the normal charging mode. The method of FIG. 7 includes the following.

710, the power adapter determines to activate the quick charging mode.

720, the power adapter conducts a handshake communication with the mobile terminal via a second instruction, so as to determine a charging voltage of the quick charging mode.

730, the power adapter conducts a handshake communication with the mobile terminal via a third instruction, so as to determine the charging current of the quick charging mode.

740, the power adapter adjusts an output voltage and an output current of the power adapter to be the charging voltage of the quick charging mode and the charging current of the quick charging mode respectively to enter a constant current phase.

750, the power adapter conducts a handshake communication with the mobile terminal via a fourth instruction during the constant current phase to adjust the output current of the power adapter, so as to charge the mobile terminal in a multi-stage constant current mode.

In at least one embodiment, the power adapter does not increase the charging current blindly for quick charging, but negotiates with the mobile terminal via the bidirectional communication with the mobile terminal to determine whether the quick charging mode can be adopted.

Optionally, in one embodiment, determining to activate the quick charging mode by the power adapter includes: conducting, by the power adapter, a handshake communication with the mobile terminal via a first instruction to determine to activate the quick charging mode.

Optionally, in one embodiment, conducting, by the power adapter, the handshake communication with the mobile terminal via the first instruction to determine to activate the quick charging mode includes: transmitting, by the power adapter, the first instruction to the mobile terminal, wherein the first instruction is configured to query the mobile terminal for whether to activate the quick charging mode; receiving, by the power adapter, a reply instruction for the first instruction from the mobile terminal; and determining, by the power adapter, to activate the quick charging mode when the reply instruction for the first instruction indicates that the mobile terminal agrees to activate the quick charging mode.

Optionally, in one embodiment, the reply instruction for the first instruction includes impedance information for indicating path impedance of the mobile terminal. The impedance information is used for the power adapter to determine whether the USB interface is in bad contact during the constant current phase.

Optionally, in one embodiment, the method of FIG. 7 can further include: determining, by the power adapter, that the mobile terminal has recognized a type of the power adapter when the power adapter determines that within a preset time length a charging current provided to the mobile terminal by the power adapter is greater than or equal to a preset current threshold during the process that the power adapter is coupled to the mobile terminal. Transmitting the first instruction to the mobile terminal by the power adapter includes: transmitting, by the power adapter, the first instruction to the mobile terminal when the power adapter determines that the mobile terminal has recognized the type of the power adapter.

Optionally, in one embodiment, the method of FIG. 7 can further include: when the reply instruction for the first instruction indicating that the mobile terminal disagrees to activate the quick charging mode, repeating, by the power adapter, the above process of detecting the charging current and the handshake communication based on the first instruction until the mobile terminal agrees to activate the quick charging mode or the charging current is less than the preset current threshold.

Optionally, in one embodiment, determining to activate the quick charging mode by the power adapter includes: receiving, by the power adapter, a query message from the mobile terminal, wherein the query message is configured to query whether the power adapter supports the quick charging mode; transmitting, by the power adapter, a response message to mobile terminal, wherein the response message is configured to indicate that the power adapter supports the quick charging mode; and receiving, by the power adapter, an indication message from the mobile terminal, wherein the indication message is configured to instruct the power adapter to activate the quick charging mode.

Optionally, in one embodiment, conducting, by the power adapter, the handshake communication with the mobile terminal via the second instruction to determine a charging voltage of the quick charging mode includes: transmitting, by the power adapter, the second instruction to the mobile terminal, wherein the second instruction is configured to query whether a current output voltage of the power adapter is proper to be the charging voltage of the quick charging mode; receiving, by the power adapter, a reply instruction for the second instruction from the mobile terminal, wherein the reply instruction for the second instruction is configured to indicate that the current output voltage of the power adapter is proper, high, or low; determining, by the power adapter, the current output voltage of the power adapter as the charging voltage of the quick charging mode when the reply instruction for the second instruction indicates that the current output voltage of the power adapter is proper; when the reply instruction for the second instruction indicating that the current output voltage of the power adapter is high or low, adjusting the current output voltage of the power adapter according to the reply instruction for the second instruction by the power adapter, and repeating the handshake communication based on the second instruction by the power adapter to constantly adjust the current output voltage of the power adapter until the reply instruction for the second instruction indicates that the current output voltage of the power adapter is proper.

Optionally, in one embodiment, the method of FIG. 7 can further include: determining, by the power adapter, a time length of the handshake communication based on the second instruction; when the time length being greater than a preset time length threshold, determining that the handshake communication based on the second instruction is abnormal by the power adapter, exiting the handshake communication of the quick charging mode by the power adapter, or redetermining whether to activate the quick charging mode by the power adapter.

It can be understood that in the embodiment of the present disclosure, redetermining whether to activate the quick charging mode is a handshake negotiation process for repeating the quick charging process, for example, repeating the phase 1 of FIG. 3.

Optionally, in one embodiment, conducting, by the power adapter, the handshake communication with the mobile terminal via the third instruction to determine the charging current of the quick charging mode includes: transmitting, by the power adapter, the third instruction to the mobile terminal, wherein the third instruction is configured to query a maximum charging current which is currently supported by the mobile terminal; receiving, by the power adapter, a reply instruction for the third instruction from the mobile terminal, wherein the reply instruction for the third instruction is configured to indicate the maximum charging current which is currently supported by the mobile terminal; and determining, by the power adapter, the charging current of the quick charging mode according to the reply instruction for the third instruction.

Optionally, in one embodiment, adjusting, by the power adapter, the output current of the power adapter to be the charging current of the quick charging mode includes: adjusting, by the power adapter, the output current of the power adapter to be the charging current of the quick charging mode by controlling speed for adjusting current, wherein the speed for adjusting current is within a preset speed range for adjusting current.

Optionally, in one embodiment, conducting, by the power adapter, the handshake communication via the fourth instruction to adjust an output current of the power adapter during the constant current phase includes: transmitting, by the power adapter, the fourth instruction to the mobile terminal during the constant current phase, wherein the fourth instruction is configured to query a current voltage of a battery of the mobile terminal; receiving, by the power adapter, a reply instruction for the fourth instruction to the mobile terminal, wherein the reply instruction for the fourth instruction is configured to indicate the current voltage of the battery of the mobile terminal; adjusting, by the power adapter, the output current of the power adapter according to be the current voltage of the battery.

Optionally, in one embodiment, transmitting, by the power adapter, the fourth instruction for querying the current voltage of the battery of the mobile terminal to the mobile terminal during the constant current phase includes: transmitting, by the power adapter, the fourth instruction to the mobile terminal every a preset time interval during the constant current phase.

Optionally, in one embodiment, during the constant current phase, in each process of adjusting the output current of the power adapter, an amplitude of adjusting the output current of the power adapter is less than or equal to 5% of the current output current of the power adapter.

Optionally, in one embodiment, the method of FIG. 7 further includes: receiving, by the power adapter, impedance information for indicating path impedance of the mobile terminal from the mobile terminal; determining, by the power adapter, an impedance of a charging circuit from the power adapter to the battery according to the current output voltage of the power adapter and the current voltage of the battery during the constant current phase; determining, by the power adapter, whether the USB interface is in bad contact according to the impedance of the charging circuit from the power adapter to the battery, the path impedance of the mobile terminal, and path impedance of a charging circuit between the power adapter and the mobile terminal; and exiting the quick charging mode or redetermining whether to activate the quick charging mode by the power adapter when the USB interface is in bad contact.

Optionally, in one embodiment, the method of FIG. 7 further includes: transmitting, by the power adapter, a fifth instruction to the mobile terminal when the USB interface is in bad contact, wherein the fifth instruction is configured to indicate that the USB interface is in bad contact and the power adapter is ready to exit the quick charging mode or redetermine whether to activate the quick charging mode.

Optionally, in one embodiment, during the constant current phase, a communication time interval between the power adapter and the mobile terminal is less than a preset time interval threshold, otherwise the power adapter exits the quick charging mode or redetermines whether to activate the quick charging mode.

Optionally, in one embodiment, stop of the quick charging mode includes two stop modes: a recoverable stop mode and a non-recoverable stop mode. In the recoverable stop mode, the power adapter or the mobile terminal again activates the quick charging mode, and the power adapter again conducts the handshake communication with the mobile terminal. In the non-recoverable stop mode, the power adapter or the mobile terminal does not activate the quick charging mode again, and the power adapter charges the mobile terminal in the normal charging mode, or does not charge the mobile terminal again.

Optionally, in one embodiment, a condition suitable for the recoverable stop mode includes: when a communication fault occurs between the power adapter and the mobile terminal, or the battery of the mobile terminal becomes abnormal, the quick charging mode is stopped, the power adapter requeries the mobile terminal for whether to agree to activate the quick charging mode, and the mobile terminal agrees to again activate the quick charging mode. Or, a condition suitable for the non-recoverable stop mode includes: when the battery of the mobile terminal is fully charged or the USB interface is in bad contact, the power adapter requeries the mobile terminal for whether to agree to activate the quick charging mode, and the mobile terminal disagrees to activate the quick charging mode.

Optionally, in one embodiment, the method of FIG. 7 further includes: determining, by the power adapter, whether the data line of the USB interface of the power adapter and the mobile terminal is the data line which can supports the quick charging mode.

Optionally, in one embodiment, during any process of the handshake communication between the power adapter and the mobile terminal, when a communication fault occurs, the quick charging mode is stopped.

Optionally, in one embodiment, during the process of the communication between the power adapter and the mobile terminal, the power adapter is used as a host device to provide clock signal for synchronization between the power adapter and the mobile terminal.

Optionally, in one embodiment, the power adapter provides the clock signal via a D+ data line of the USB interface. The communication and/or data transmission is performed between the power adapter and the mobile terminal via a D– data line of the USB interface.

Optionally, in one embodiment, the communication and/or charging process between the power adapter and the mobile terminal is based on open-loop current multi-stage constant current quick charging technology or a quick charging communication protocol.

Figure 8:
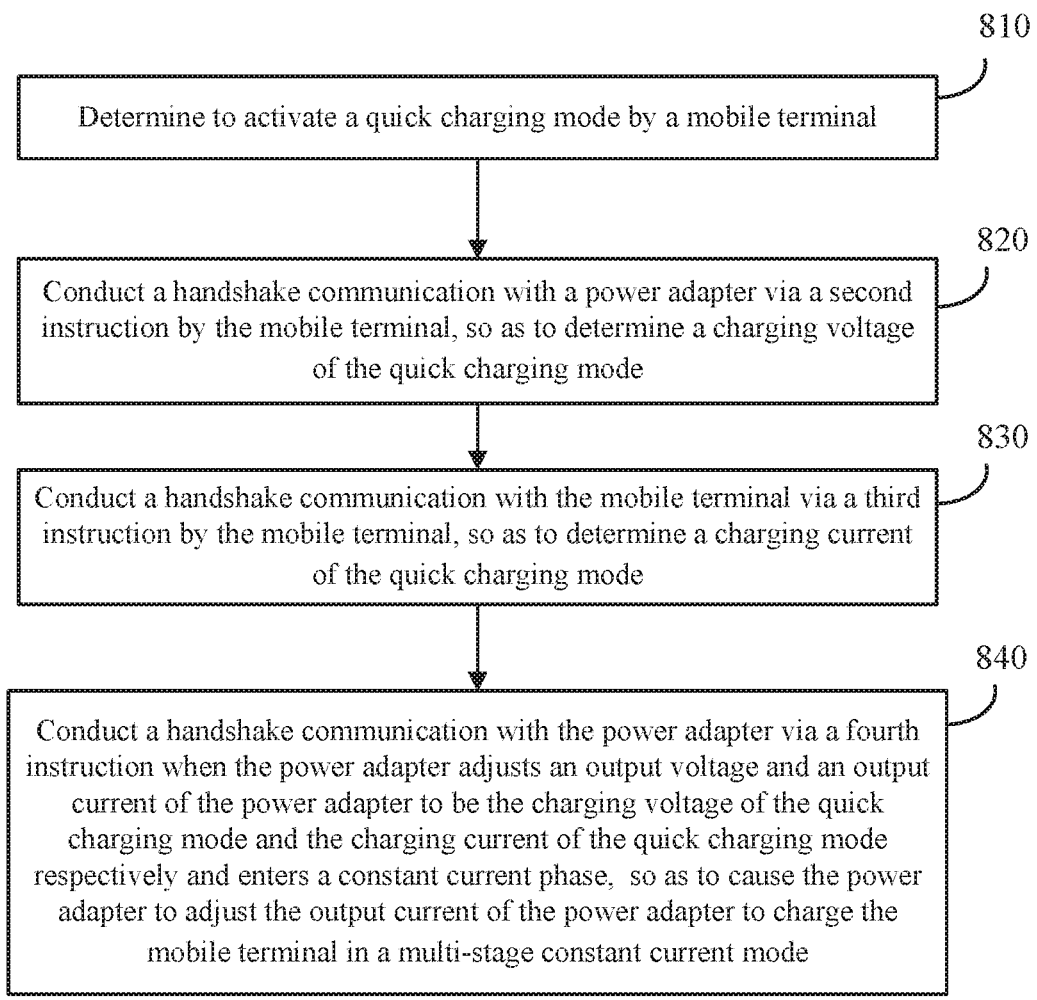
FIG. 8 is a schematic flow chart of a quick charging method in accordance with an exemplary embodiment of the present disclosure.

FIG. 8 is a schematic view of a quick charging method in accordance with an exemplary embodiment of the present disclosure. The method of FIG. 8 is applied to a mobile terminal. The mobile terminal is coupled to a power adapter via a USB interface. A power line of the USB interface is used for charging the mobile terminal. A data line of the USB interface is used for a bidirectional communication between the mobile terminal and the power adapter. The mobile terminal supports a normal charging mode and a quick charging mode, and a charging current of the quick charging mode is greater than a charging current of the normal charging mode. The method of FIG. 8 includes the following.

810, the mobile terminal determines to activate the quick charging mode.

820, the mobile terminal conducts a handshake communication with the power adapter via a second instruction, so as to determine a charging voltage of the quick charging mode.

830, the mobile terminal conducts a handshake communication with the mobile terminal via a third instruction, so as to determine the charging current of the quick charging mode.

840, the mobile terminal conducts a handshake communication with the power adapter via a fourth instruction when the power adapter adjusts an output voltage and an output current of the power adapter to be the charging voltage of the quick charging mode and the charging current of the quick charging mode respectively and enters a constant current phase, so as to cause the power adapter to adjust the output current of the power adapter to charge the mobile terminal in a multi-stage constant current mode.

In at least one embodiment, the power adapter does not increase the charging current blindly for quick charging, but negotiates with the mobile terminal via the bidirectional communication with the mobile terminal to determine whether the quick charging mode can be adopted.

Optionally, in one embodiment, determining to activate the quick charging mode by the mobile terminal includes: conducting, by the mobile terminal, a handshake communication with the power adapter via a first instruction to determine to activate the quick charging mode.

Optionally, in one embodiment, conducting, by the mobile terminal, the handshake communication with the power adapter via the first instruction to determine to activate the quick charging mode includes: receiving, by the mobile terminal, the first instruction from the power adapter, wherein the first instruction is configured to query the mobile terminal for whether to activate the quick charging mode; transmitting, by the mobile terminal, a reply instruction for the first instruction to the power adapter, wherein the reply instruction for the first instruction is configured to indicate that the mobile terminal agrees to activate the quick charging mode.

Optionally, in one embodiment, the reply instruction for the first instruction includes impedance information for indicating path impedance of the mobile terminal. The impedance information is used for the power adapter to determine whether the USB interface is in bad contact during the constant current phase.

Optionally, in one embodiment, the method of FIG. 8 can further include: detecting, by the mobile terminal, a type of the power adapter via a D+ data line and a D– data line of the USB interface during the process that the mobile terminal is coupled to the power adapter; and receiving, by the mobile terminal, a charging current from the power adapter, wherein the charging current is greater than or equal to a preset current threshold. Receiving the first instruction from the power adapter by the mobile terminal includes: receiving, by the mobile terminal, the first instruction from the power adapter when the power adapter determines that within a preset time length the charging current provided to the mobile terminal by the power adapter is greater than or equal to the preset current threshold.

Optionally, in one embodiment, determining to activate the quick charging mode by the mobile terminal includes: transmitting, by the mobile terminal, a query message to the power adapter, wherein the query message is configured to query whether the power adapter supports the quick charging mode; receiving, by the mobile terminal, a response message from the power adapter, wherein the response message is configured to indicate that the power adapter supports the quick charging mode; and transmitting, by the mobile terminal, an indication message to the power adapter, wherein the indication message is configured to instruct the power adapter to activate the quick charging mode.

Optionally, in one embodiment, conducting, by the mobile terminal, the handshake communication with the power adapter via the second instruction to determine a charging voltage of the quick charging mode includes: receiving, by the mobile terminal, the second instruction from the power adapter, wherein the second instruction is configured to query whether a current output voltage of the power adapter is proper to be the charging voltage of the quick charging mode; transmitting, by the mobile terminal, a reply instruction for the second instruction to the power adapter, wherein the reply instruction for the second instruction is configured to indicate that the current output voltage of the power adapter is proper, high, or low, so as to cause the power adapter to determine the charging voltage of the quick charging mode according to the reply instruction for the second instruction.

Optionally, in one embodiment, transmitting, by the mobile terminal, the reply instruction for the second instruction to the power adapter includes: transmitting, by the mobile terminal, the reply instruction for the second instruction to the power adapter when the mobile terminal determines that a current output voltage of the power adapter is greater than the battery voltage of the mobile terminal and a voltage difference between the current output voltage of the power adapter and the battery voltage is within a preset voltage difference threshold range, wherein the reply instruction for the second instruction is configured to indicate that the current output voltage of the power adapter is proper.

Optionally, in one embodiment, the voltage difference threshold range is 200 mV~500 mV.

Optionally, in one embodiment, the method of FIG. 8 can further include: determining, by the mobile terminal, a time length of the handshake communication based on the second instruction; when the time length being greater than a preset time length threshold, determining, by the power adapter, that the handshake communication based on the second instruction is abnormal, exiting the handshake communication of the quick charging mode by the mobile terminal, or redetermining whether to activate the quick charging mode by the mobile terminal.

Optionally, in one embodiment, conducting, by the mobile terminal, the handshake communication with the power adapter via the third instruction to determine the charging current of the quick charging mode includes: receiving, by the mobile terminal, the third instruction from the power adapter, wherein the third instruction is configured to query a maximum charging current which is currently supported by the mobile terminal; and transmitting, by the mobile terminal, a reply instruction for the third instruction to the power adapter, wherein the reply instruction for the third instruction is configured to indicate the maximum charging current which is currently supported by the mobile terminal, so as to cause the power adapter to determine the charging current of the quick charging mode according to the reply instruction for the third instruction.

Optionally, in one embodiment, conducting, by the mobile terminal, the handshake communication via the fourth instruction to adjust the output current of the power adapter includes: receiving, by the mobile terminal, the fourth instruction from the power adapter during the constant current phase, wherein the fourth instruction is configured to query a current voltage of the battery of the mobile terminal; transmitting, by the mobile terminal, a reply instruction for the fourth instruction to the power adapter, wherein the reply instruction for the fourth instruction is configured to indicate the current voltage of the battery of the mobile terminal, so as to cause the power adapter to adjust the output current of the power adapter according to the current voltage of the battery.

Optionally, in one embodiment, receiving, by the mobile terminal, the fourth instruction for querying the current voltage of the battery of the mobile terminal from the power adapter during the constant current phase includes: receiving, by the mobile terminal, the fourth instruction from the power adapter every a preset time interval during the constant current phase.

Optionally, in one embodiment, during the constant current phase, in each process of adjusting the output current of the power adapter, an amplitude of adjusting the output current of the power adapter is less than or equal to 5% of the current output current of the power adapter.

Optionally, in one embodiment, the method of FIG. 8 can further include: transmitting, by the mobile terminal, impedance information for indicating path impedance of the mobile terminal to the power adapter, so as to cause the power adapter to determine whether the USB interface is in bad contact according to the path impedance during the constant current phase; receiving, by the mobile terminal, a fifth instruction from the power adapter when the power adapter determines that USB interface is in bad contact, wherein the fifth instruction is configured to indicate that the USB interface is in bad contact, and the power adapter is ready to exit the quick charging mode or redetermine whether to activate the quick charging mode.

Optionally, in one embodiment, during the constant current phase, a communication time interval between the power adapter and the mobile terminal is less than a preset time interval threshold, otherwise the power adapter exits the quick charging mode or redetermines whether to activate the quick charging mode.

Optionally, in one embodiment, stop of the quick charging mode includes two stop modes: a recoverable stop mode and a non-recoverable stop mode. In the recoverable stop mode, the power adapter or the mobile terminal again activates the quick charging mode, and the power adapter again conducts the handshake communication with the mobile terminal. In the non-recoverable stop mode, the power adapter or the mobile terminal does not activate the quick charging mode again, and the power adapter charges the mobile terminal in the normal charging mode, or does not charge the mobile terminal again.

Optionally, in one embodiment, a condition suitable for the recoverable stop mode includes: when a communication fault occurs between the power adapter and the mobile terminal, or the battery of the mobile terminal becomes abnormal, the quick charging mode is stopped, the power adapter requeries the mobile terminal for whether to agree to activate the quick charging mode, and the mobile terminal agrees to again activate the quick charging mode. Or, a condition suitable for the non-recoverable stop mode includes: when the battery of the mobile terminal is fully charged or the USB interface is in bad contact, the power adapter requeries the mobile terminal for whether to agree to activate the quick charging mode, and the mobile terminal disagrees to activate the quick charging mode.

Optionally, in one embodiment, the method of FIG. 8 further includes: determining, by the mobile terminal, whether the data line of the USB interface of the power adapter and the mobile terminal is the data line which can support the quick charging mode.

Optionally, in one embodiment, during any process of the handshake communication between the power adapter and the mobile terminal, when a communication fault occurs, the quick charging mode is stopped.

Optionally, in one embodiment, during the process of the communication between the power adapter and the mobile terminal, the power adapter is used as a host device to provide clock signal for synchronization between the power adapter and the mobile terminal.

Optionally, in one embodiment, the power adapter provides the clock signal via the D+ data line of the USB interface. The communication and/or data transmission is performed between the power adapter and the mobile terminal via the D− data line of the USB interface.

Optionally, in one embodiment, the communication and/or charging process between the power adapter and the mobile terminal is based on open-loop current multi-stage constant current quick charging technology or a quick charging communication protocol.

In combination with FIGS. 7-8, the above specifically describes the quick charging method of the embodiments of the present disclosure. In combination with FIGS. 9-10, the following will specifically describe the power adapter and the mobile terminal of the embodiments of the present disclosure. It can be understood that the power adapter of FIG. 9 can execute various steps executed by the power adapter of FIG. 7, and the mobile terminal of FIG. 10 can execute various steps executed by the mobile terminal of FIG. 8. For simplicity, repeated description will be appropriately omitted.

Figure 9:
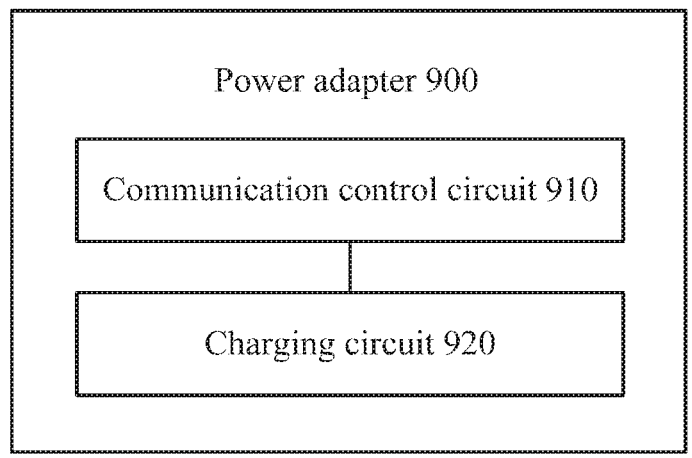
FIG. 9 is a schematic structural diagram of a power adapter in accordance with an exemplary embodiment of the present disclosure.

FIG. 9 is a schematic block diagram of a power adapter in accordance with an exemplary embodiment of the present disclosure. A power adapter 900 of FIG. 9 is coupled to a mobile terminal via a USB interface. A power line of the USB interface is used for the power adapter 900 to charge the mobile terminal. A data line of the USB interface is used for a bidirectional communication between the power adapter 900 and the mobile terminal. The power adapter 900 supports a normal charging mode and a quick charging mode, and a charging current of the quick charging mode is greater than a charging current of the normal charging mode. The power adapter 900 includes a communication control circuit 910 (or named as a communication circuit) and a charging circuit 920.

The communication control circuit 910 is configured to determine to activate the quick charging mode, conduct a handshake communication with the mobile terminal via a second instruction to determine a charging voltage of the quick charging mode, conduct a handshake communication with the mobile terminal via a third instruction to determine the charging current of the quick charging mode, adjust an output voltage and an output current of the power adapter to be the charging voltage of the quick charging mode and the charging current of the quick charging mode respectively to enter a constant current phase, and conduct a handshake communication with the mobile terminal via a fourth instruction during the constant current phase to adjust the output current of the power adapter, so as to control the charging circuit 920 to charge the mobile terminal in a multi-stage constant current mode.

In at least one embodiment, the power adapter does not increase the charging current blindly for quick charging, but negotiates with the mobile terminal via the bidirectional communication with the mobile terminal to determine whether the quick charging mode can be adopted.

Optionally, in one embodiment, the communication control circuit 910 is configured to conduct a handshake communication with the mobile terminal via a first instruction to determine to activate the quick charging mode.

Optionally, in one embodiment, the communication control circuit 910 is configured to transmit the first instruction to the mobile terminal, and the first instruction is configured to query the mobile terminal for whether to activate the quick charging mode. The communication control circuit 910 is further configured to receive a reply instruction for the first instruction from the mobile terminal, and determine to activate the quick charging mode when the reply instruction for the first instruction indicates that the mobile terminal agrees to activate the quick charging mode.

Optionally, in one embodiment, the reply instruction for the first instruction includes impedance information for indicating path impedance of the mobile terminal. The impedance information is used for the power adapter to determine whether the USB interface is in bad contact during the constant current phase.

Optionally, in one embodiment, the communication control circuit 910 is configured to determine that the mobile terminal has recognized a type of the power adapter when the power adapter determines that within a preset time length a charging current provided to the mobile terminal by the power adapter is greater than or equal to a preset current threshold during the process that the power adapter is coupled to the mobile terminal, and transmit the first instruction to the mobile terminal when the power adapter determines that the mobile terminal has recognized the type of the power adapter.

Optionally, in one embodiment, when the reply instruction for the first instruction indicates that the mobile terminal disagrees to activate the quick charging mode, the communication control circuit 910 is further configured to repeat the above process of detecting the charging current and the handshake communication based on the first instruction until the mobile terminal agrees to activate the quick charging mode or the charging current is less than the preset current threshold.

Optionally, in one embodiment, the communication control circuit 910 is further configured to receive a query message from the mobile terminal, and the query message is configured to query whether the power adapter supports the quick charging mode. The communication control circuit 910 is further configured to transmit a response message to mobile terminal, and the response message is configured to indicate that the power adapter supports the quick charging mode. The communication control circuit 910 is further configured to receive an indication message from the mobile terminal, and the indication message is configured to instruct the power adapter to activate the quick charging mode.

Optionally, in one embodiment, the communication control circuit 910 is configured to transmit the second instruction to the mobile terminal, and the second instruction is configured to query whether a current output voltage of the power adapter is proper to be the charging voltage of the quick charging mode. The communication control circuit 910 is further configured to receive a reply instruction for the second instruction from the mobile terminal, and the reply instruction for the second instruction is configured to indicate that the current output voltage of the power adapter is proper, high, or low. The communication control circuit 910 is further configured to determine the current output voltage of the power adapter as the charging voltage of the quick charging mode when the reply instruction for the second instruction indicates that the current output voltage of the power adapter is proper. When the reply instruction for the second instruction indicates that the current output voltage of the power adapter is high or low, the communication control circuit 910 is further configured to adjust the current output voltage of the power adapter according to the reply instruction for the second instruction, and repeat the handshake communication based on the second instruction to constantly adjust the current output voltage of the power adapter until the reply instruction for the second instruction indicates that the current output voltage of the power adapter is proper.

Optionally, in one embodiment, the communication control circuit 910 is further configured to determine a time length of the handshake communication based on the second instruction. When the time length is greater than a preset time length threshold, the communication control circuit 910 is further configured to determine that the handshake communication based on the second instruction is abnormal, exit the handshake communication process of the quick charging mode, or redetermine whether to activate the quick charging mode.

Optionally, in one embodiment, the communication control circuit 910 is configured to transmit the third instruction to the mobile terminal, and the third instruction is configured to query a maximum charging current which is currently supported by the mobile terminal. The communication control circuit 910 is further configured to receive a reply instruction for the third instruction from the mobile terminal, and the reply instruction for the third instruction is configured to indicate the maximum charging current which is currently supported by the mobile terminal. The communication control circuit 910 is further configured to determine the charging current of the quick charging mode according to the reply instruction for the third instruction.

Optionally, in one embodiment, the communication control circuit 910 is configured to adjust the output current of the power adapter 900 to be the charging current of the quick charging mode by controlling speed for adjusting current, and the speed for adjusting current is within a preset speed range for adjusting current.

Optionally, in one embodiment, the communication control circuit 910 is configured to transmit the fourth instruction to the mobile terminal during the constant current phase, and the fourth instruction is configured to query a current voltage of a battery of the mobile terminal. The communication control circuit 910 is further configured to receive a reply instruction for the fourth instruction to the mobile terminal, and the reply instruction for the fourth instruction is configured to indicate the current voltage of the battery of the mobile terminal. The communication control circuit 910 is configured to adjust the output current of the power adapter according to the current voltage of the battery.

Optionally, in one embodiment, the communication control circuit 910 is configured to transmit the fourth instruction to the mobile terminal every a preset time interval during the constant current phase.

Optionally, in one embodiment, during the constant current phase, in each process of adjusting the output current of the power adapter, an amplitude of adjusting the output current of the power adapter is less than or equal to 5% of the current output current of the power adapter.

Optionally, in one embodiment, the communication control circuit 910 is further configured to receive impedance information for indicating path impedance of the mobile terminal from the mobile terminal, determine an impedance of a charging circuit from the power adapter to the battery according to the current output voltage of the power adapter and the current voltage of the battery during the constant current phase, determine whether the USB interface is in bad contact according to the impedance of the charging circuit from the power adapter to the battery, the path impedance of the mobile terminal, and path impedance of a charging circuit between the power adapter and the mobile terminal, and exit the quick charging mode or redetermine whether to activate the quick charging mode when the USB interface is in bad contact.

Optionally, in one embodiment, the communication control circuit 910 is further configured to transmit a fifth instruction to the mobile terminal when the USB interface is in bad contact, and the fifth instruction is configured to indicate that the USB interface is in bad contact and the power adapter is ready to exit the quick charging mode or redetermine whether to activate the quick charging mode.

Optionally, in one embodiment, during the constant phase, a communication time interval between the power adapter and the mobile terminal is less than a preset time interval threshold, otherwise the power adapter exits the quick charging mode or redetermines whether to activate the quick charging mode.

Optionally, in one embodiment, stop of the quick charging mode includes two stop modes: a recoverable stop mode and a non-recoverable stop mode. In the recoverable stop mode, the power adapter or the mobile terminal again activates the quick charging mode, and the power adapter again conducts the handshake communication with the mobile terminal. In the non-recoverable stop mode, the power adapter or the mobile terminal does not activate the quick charging mode again, and the power adapter charges the mobile terminal in the normal charging mode, or does not charge the mobile terminal again.

Optionally, in one embodiment, a condition suitable for the recoverable stop mode includes: when a communication fault occurs between the power adapter and the mobile terminal, or the battery of the mobile terminal becomes abnormal, the quick charging mode is stopped, the power adapter requeries the mobile terminal for whether to agree to activate the quick charging mode, and the mobile terminal agrees to again activate the quick charging mode. Or, a condition suitable for the non-recoverable stop mode includes: when the battery of the mobile terminal is fully charged or the USB interface is in bad contact, the power adapter requeries the mobile terminal for whether to agree to activate the quick charging mode, and the mobile terminal disagrees to activate the quick charging mode.

Optionally, in one embodiment, the communication control circuit 910 is further configured to determine whether the data line of the USB interface of the power adapter and the mobile terminal is the data line which can supports the quick charging mode.

Optionally, in one embodiment, during the process of the handshake communication between the power adapter and the mobile terminal, when a communication fault occurs, the quick charging mode is stopped.

Optionally, in one embodiment, during the process of the communication between the power adapter and the mobile terminal, the power adapter is used as a host device to provide clock signal for synchronization between the power adapter and the mobile terminal.

Optionally, in one embodiment, the power adapter provides the clock signal via a D+ data line of the USB interface. The communication and/or data transmission is performed between the power adapter and the mobile terminal via a D− data line of the USB interface.

Optionally, in one embodiment, the communication and/or charging process between the power adapter and the mobile terminal is based on open-loop current multi-stage constant current quick charging technology or a quick charging communication protocol.

Figure 10:
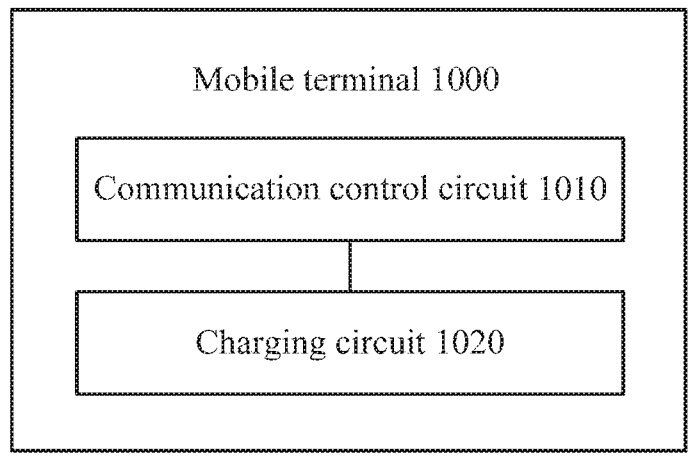
FIG. 10 is a schematic structural diagram of a mobile terminal in accordance with an exemplary embodiment of the present disclosure.

FIG. 10 is a schematic view of a mobile terminal in accordance with an exemplary embodiment of the present disclosure. A mobile terminal 1000 of FIG. 10 is coupled to a power adapter via a USB interface. A power line of the USB interface is used for charging the mobile terminal 1000. A data line of the USB interface is used for a bidirectional communication between the mobile terminal 1000 and the power adapter. The mobile terminal 1000 supports a normal charging mode and a quick charging mode, and a charging current of the quick charging mode is greater than a charging current of the normal charging mode. The mobile terminal 1000 includes a communication control circuit 1010 (or named as a communication circuit) and a charging circuit 1020.

The communication control circuit 1010 is configured to determine to activate the quick charging mode, conduct a handshake communication with the power adapter via a second instruction to determine a charging voltage of the quick charging mode, conduct a handshake communication with the mobile terminal via a third instruction to determine the charging current of the quick charging mode, and conduct a handshake communication with the power adapter via a fourth instruction when the power adapter adjusts an output voltage and an output current of the power adapter to be the charging voltage of the quick charging mode and the charging current of the quick charging mode respectively and enters a constant current phase, so as to cause the power adapter to adjust the output current of the power adapter to charge the mobile terminal in a multi-stage constant current mode via the charging circuit 1020.

In at least one embodiment, the power adapter does not increase the charging current blindly for quick charging, but negotiates with the mobile terminal via the bidirectional communication with the mobile terminal to determine whether the quick charging mode can be adopted.

Optionally, in one embodiment, the communication control circuit 1010 is configured to conduct a handshake communication with the power adapter via a first instruction to determine to activate the quick charging mode.

Optionally, in one embodiment, the communication control circuit 1010 is configured to receive the first instruction from the power adapter, and the first instruction is configured to query the mobile terminal for whether to activate the quick charging mode. The communication control circuit 1010 is configured to transmit a reply instruction for the first instruction to the power adapter, and the reply instruction for the first instruction indicates that the mobile terminal agrees to activate the quick charging mode.

Optionally, in one embodiment, the reply instruction for the first instruction includes impedance information for indicating path impedance of the mobile terminal. The impedance information is used for the power adapter to determine whether the USB interface is in bad contact during the constant current phase.

Optionally, in one embodiment, the communication control circuit 1010 is further configured to detect a type of the power adapter via a D+ data line and a D− data line of the USB interface during the process that the mobile terminal is coupled to the power adapter, and receive a charging current from the power adapter, and the charging current is greater than or equal to a preset current threshold. The communication control circuit 1010 is further configured to receive the first instruction from the power adapter when the power adapter determines that within a preset time length the charging current provided to the mobile terminal by the power adapter is greater than or equal to the preset current threshold.

Optionally, in one embodiment, the communication control circuit 1010 is configured to transmit a query message to the power adapter, and the query message is configured to query whether the power adapter supports the quick charging mode. The communication control circuit 1010 is further configured to receive a response message from the power adapter, and the response message is configured to indicate that the power adapter supports the quick charging mode. The communication control circuit 1010 is further configured to transmit an indication message to the power adapter, and the indication message is configured to instruct the power adapter to activate the quick charging mode.

Optionally, in one embodiment, the communication control circuit 1010 is configured to receive the second instruction from the power adapter, and the second instruction is configured to query whether a current output voltage of the power adapter is proper to be the charging voltage of the quick charging mode. The communication control circuit 1010 is further configured to transmit a reply instruction for the second instruction to the power adapter, and the reply instruction for the second instruction is configured to indicate that the current output voltage of the power adapter is proper, high, or low, so as to cause the power adapter to determine the charging voltage of the quick charging mode according to the reply instruction for the second instruction.

Optionally, in one embodiment, the communication control circuit 1010 is configured to transmit the reply instruction for the second instruction to the power adapter when the mobile terminal determines that a current output voltage of the power adapter is greater than the battery voltage of the mobile terminal and a voltage difference between the current output voltage of the power adapter and the battery voltage is within a preset voltage difference threshold range, and the reply instruction for the second instruction is configured to indicate that the current output voltage of the power adapter is proper.

Optionally, in one embodiment, the voltage difference threshold range is 200 mV~500 mV.

Optionally, in one embodiment, the communication control circuit 1010 is further configured to determine a time length of the handshake communication based on the second instruction. When the time length is greater than a preset time length threshold, the communication control circuit 1010 is further configured to determine that the handshake communication based on the second instruction is abnormal, exit the handshake communication of the quick charging mode, or redetermine whether to activate the quick charging mode.

Optionally, in one embodiment, the communication control circuit 1010 is configured to receive a third instruction from the power adapter, and the third instruction is configured to query a maximum charging current which is currently supported by the mobile terminal. The communication control circuit 1010 is further configured to transmit a reply instruction for the third instruction to the power adapter, and the reply instruction for the third instruction is configured to indicate the maximum charging current which is currently supported by the mobile terminal, so as to cause the power adapter to determine the charging current of the quick charging mode according to the reply instruction for the third instruction.

Optionally, in one embodiment, the communication control circuit 1010 is configured to receive the fourth instruction from the power adapter during the constant current phase, and the fourth instruction is configured to query a current voltage of a battery of the mobile terminal. The communication control circuit 1010 is configured to transmit a reply instruction for the fourth instruction to the power adapter, and the reply instruction for the fourth instruction is configured to indicate the current voltage of the battery of the mobile terminal, so as to cause the power adapter to adjust the output current of the power adapter according to the current voltage of the battery.

Optionally, in one embodiment, the communication control circuit 1010 is configured to receive the fourth instruction from the power adapter every a preset time interval during the constant current phase.

Optionally, in one embodiment, during the constant current phase, in each process of adjusting the output current of the power adapter, an amplitude of adjusting the output current of the power adapter is less than or equal to 5% of the current output current of the power adapter.

Optionally, in one embodiment, the communication control circuit 1010 is further configured to transmit impedance information for indicating path impedance of the mobile terminal to the power adapter to cause the power adapter to determine whether the USB interface is in bad contact according to the path impedance during the constant current phase, receive a fifth instruction from the power adapter when the power adapter determines that USB interface is in bad contact, and the fifth instruction is configured to indicate that the USB interface is in bad contact, and the power adapter is ready to exit the quick charging mode or redetermine whether to activate the quick charging mode.

Optionally, in one embodiment, during the constant current phase, a communication time interval between the power adapter and the mobile terminal is less than a preset time interval threshold, otherwise the power adapter exits the quick charging mode or again activates the quick charging mode.

Optionally, in one embodiment, stop of the quick charging mode includes two stop modes: a recoverable stop mode and a non-recoverable stop mode. In the recoverable stop mode, the power adapter or the mobile terminal again activates the quick charging mode, and the power adapter again conducts the handshake communication with the mobile terminal. In the non-recoverable stop mode, the power adapter or the mobile terminal does not activate the quick charging mode again, and the power adapter charges the mobile terminal in the normal charging mode, or does not charge the mobile terminal again.

Optionally, in one embodiment, a condition suitable for the recoverable stop mode includes: when a communication fault occurs between the power adapter and the mobile terminal, or the battery of the mobile terminal becomes abnormal, the quick charging mode is stopped, the power adapter requeries the mobile terminal for whether to agree to activate the quick charging mode, and the mobile terminal agrees to again activate the quick charging mode. Or, a condition suitable for the non-recoverable stop mode includes: when the battery of the mobile terminal is fully charged or the USB interface is in bad contact, the power adapter requeries the mobile terminal for whether to agree to activate the quick charging mode, and the mobile terminal disagrees to activate the quick charging mode.

Optionally, in one embodiment, the communication control circuit 1010 is further configured to determine whether the data line of the USB interface of the power adapter and the mobile terminal is the data line which can support the quick charging mode.

Optionally, in one embodiment, during the process of the handshake communication between the power adapter and the mobile terminal, when a communication fault occurs, the quick charging mode is stopped.

Optionally, in one embodiment, during the process of the communication between the power adapter and the mobile terminal, the power adapter is used as a host device to provide clock signal for synchronization between the power adapter and the mobile terminal.

Optionally, in one embodiment, the power adapter provides the clock signal via the D+ data line of the USB interface. The communication and/or data transmission is performed between the power adapter and the mobile terminal via the D− data line of the USB interface.

Optionally, in one embodiment, the communication and/or charging process between the power adapter and the mobile terminal is based on open-loop current multi-stage constant current quick charging technology or a quick charging communication protocol.

Those skilled in the art should appreciate that units and programming steps of various examples described in the embodiments of the present disclosure can be realized by electronic hardware or a combination of computer software and electronic hardware. Whether these functions are realized by hardware or software depends on particular applications and design constraint conditions. For each particular application, professionals can employ different methods to realize described functions, but this realization should fall into the scope of the present disclosure.

For convenience and simplicity, those skilled in the art can clearly understand that when the specific work processes of the above described systems, devices, and units are described, the corresponding processes of the above method embodiments can be referred, which will not be repeated herein.

In several embodiments provided by the present disclosure, it can be understood that the disclosed systems, devices, and methods can be implemented by other manners. For example, the device embodiments described above are only schematic. For example, the units are divided according to logic functions and can be divided by another manner in an actual implementation. For example, several units or assemblies can be combined or can be integrated into another system, or some features can be ignored, or are not executed. Another point is that mutual coupling or direct coupling or communication connection shown or discussed herein can be indirect coupling or communication connection through certain interfaces, devices, or units, and can be in the form of electricity, machine, or other.

The units illustrated as separate units can be or cannot be physically separated, and components shown in units can be or cannot be physical units, that is, can be in a place, or can be distributed in several network units. A part of or all of the units can be selected according to actual need to realize the purpose of the solution of the embodiments.

Additionally, various functional units in the embodiments of the present disclosure can be integrated into one processing unit, or various functional units can exist alone, or two or more units can be integrated into one unit.

If the functions can be realized in the form of software functional units and can be sold or used as stand-alone products, they can be stored in a computer-readable storage medium. Based on such understanding, the technical solution of the present disclosure or the part that contributes to the existing technology or a part of the technical solution can be embodied in the form of a software product. The computer software product can be stored in a storage medium, and include a plurality of instructions configured to direct a computer device (personal computer, server, or network device) to execute all of or a part of steps of various embodiments of the present disclosure. The storage mediums described above include a U disk, a mobile disk, a read-only memory (ROM), a random access memory (RAM), a disc, a compact disc, or other medium storing program codes.

The foregoing descriptions are merely preferred embodiments of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A mobile terminal, the mobile terminal being coupled to a power adapter via a Universal Serial Bus (USB) interface, a power line of the USB interface being used for charging the mobile terminal, a data line of the USB interface being used for a bidirectional communication between the mobile terminal and the power adapter, the mobile terminal supporting a normal charging mode and a quick charging mode, a speed of charging the mobile terminal in the quick charging mode being faster than a speed of charging the mobile terminal in the normal charging mode, the mobile terminal comprising:
   a communication circuit configured to communicate with the power adapter bidirectionally via the data line of the USB interface, so as to cause the power adapter to determine to charge the mobile terminal in the quick charging mode and cause the power adapter to adjust an output current of the power adapter to reach a charging current of the quick charging mode; and
   a charging circuit configured to receive the output current of the power adapter to charge a battery of the mobile terminal in the quick charging mode after the output current of the power adapter is adjusted to reach the charging current of the quick charging mode,
   wherein the communication circuit is further configured to communicate with the power adapter bidirectionally via the data line of the USB interface during the process that the mobile terminal is charged in the quick charging mode, so as to cause the power adapter to adjust the output current of the power adapter every preset time interval, the output current of the power adapter after adjustment reaching another charging current of the quick charging mode, and an amplitude of adjustment of the output current of the power adapter falling within a preset range.

2. The mobile terminal of claim 1, wherein the communication circuit is configured to receive a first instruction from the power adapter, and the first instruction is configured to query the mobile terminal for whether to activate the quick charging mode; and the communication circuit is further configured to transmit a reply instruction for the first instruction to the power adapter, and the reply instruction for the first instruction is configured to indicate that the mobile terminal agrees to activate the quick charging mode.

3. The mobile terminal of claim 2, wherein the charging circuit is further configured to cause the power adapter to charge the mobile terminal in the normal charging mode; the communication circuit is configured to receive the first instruction from the power adapter when the power adapter determines that a time length of using the normal charging mode for charging is greater than a preset threshold.

4. The mobile terminal of claim 1, wherein the communication circuit is further configured to communicate with the power adapter bidirectionally via the data line of the USB interface to cause the power adapter to determine a charging voltage of the quick charging mode.

5. The mobile terminal of claim 4, wherein the communication circuit is configured to receive a second instruction from the power adapter, and the second instruction is configured to query whether a current voltage of the power adapter is proper to be the charging voltage of the quick charging mode; the communication circuit is further configured to transmit a reply instruction for the second instruction to the power adapter, wherein the reply instruction for the second instruction is configured to indicate that the current voltage of the power adapter is proper, high, or low.

6. The mobile terminal of claim 1, wherein the communication circuit is further configured to communicate with the power adapter bidirectionally via the data line of the USB interface to cause the power adapter to determine the charging current of the quick charging mode.

7. The mobile terminal of claim 6, wherein the communication circuit is configured to receive a third instruction from the power adapter, and the third instruction is configured to query a maximum charging current which is currently supported by the mobile terminal; and the communication circuit is further configured to transmit a reply instruction for the third instruction to the power adapter, and the reply instruction for the third instruction is configured to indicate the maximum charging current which is currently supported by the mobile terminal, so as to cause the power adapter to determine the charging current of the quick charging mode according to the maximum charging current.

8. The mobile terminal of claim 1, wherein the communication circuit is configured to receive a fourth instruction from the power adapter, and the fourth instruction is configured to query a current voltage of the battery of the mobile terminal; and the communication circuit is further configured to transmit a reply instruction for the fourth instruction to the power adapter, and the reply instruction for the fourth instruction is configured to indicate the current voltage of the battery of the mobile terminal, so as to cause the power adapter to adjust the output current of the power adapter according to the current voltage of the battery.

9. The mobile terminal of claim 1, wherein the communication circuit is further configured to communicate with the power adapter bidirectionally via the data line of the USB interface during the process that the power adapter charges the mobile terminal in the quick charging mode to cause the power adapter to determine whether the USB interface is in bad contact; the communication circuit is configured to receive a fourth instruction from the power adapter, and the fourth instruction is configured to query a current voltage of the battery of the mobile terminal; the communication circuit is further configured to transmit a reply instruction for the fourth instruction to the power adapter, and the reply instruction for the fourth instruction is configured to indicate the current voltage of the battery of the mobile terminal, so as to cause the power adapter to determine whether the USB interface is in bad contact according to a charging voltage of the power adapter and the current voltage of the battery.

10. A mobile terminal, the mobile terminal being coupled to a power adapter via a Universal Serial Bus (USB) interface, a power line of the USB interface being used for charging the mobile terminal, a data line of the USB interface being used for a bidirectional communication between the mobile terminal and the power adapter, the mobile terminal supporting a normal charging mode and a quick charging mode, and a speed of charging the mobile terminal in the quick charging mode being faster than a speed of charging the mobile terminal in the normal charging mode, the mobile terminal comprising:
   a charging circuit; and
   a communication control circuit configured to determine to activate the quick charging mode, conduct a handshake communication with the power adapter via a second instruction to determine a charging voltage of the quick charging mode, conduct a handshake communication with the mobile terminal via a third instruction to determine a charging current of the quick charging mode, and conduct a handshake communication with the power adapter via a fourth instruction after the power adapter adjusts an output voltage and an output current of the power adapter to reach the charging voltage of the quick charging mode and the charging current of the quick charging mode respectively and charges the mobile terminal in the quick charging mode via the charging circuit, so as to cause the power adapter to adjust the output current of the power adapter every preset time interval, the output current of the power adapter after adjustment reaching another charging current of the quick charging mode, and an amplitude of adjustment of the output current of the power adapter falling within a preset range.

11. The mobile terminal of claim 10, wherein the communication control circuit is configured to conduct a handshake communication with the power adapter via a first instruction to determine to activate the quick charging mode.

12. The mobile terminal of claim 11, wherein the communication control circuit is configured to receive the first instruction from the power adapter, and the first instruction is configured to query the mobile terminal for whether to activate the quick charging mode, and the communication control circuit is further configured to transmit a reply instruction for the first instruction to the power adapter, and the reply instruction for the first instruction indicates that the mobile terminal agrees to activate the quick charging mode.

13. The mobile terminal of claim 12, wherein the reply instruction for the first instruction comprises impedance information for indicating path impedance of the mobile terminal, and the impedance information is used for the power adapter to determine whether the USB interface is in bad contact during the constant current phase.

14. The mobile terminal of claim 12, wherein the communication control circuit is further configured to detect a type of the power adapter via a D+ data line and a D− data line of the USB interface during a process that the mobile terminal is coupled to the power adapter, and receive a charging current from the power adapter, and the charging current is greater than or equal to a preset current threshold, and the communication control circuit is further configured to receive the first instruction from the power adapter when the power adapter determines that within a preset time length the charging current provided to the mobile terminal by the power adapter is greater than or equal to the preset current threshold.

15. The mobile terminal of claim 10, wherein the communication control circuit is configured to transmit a query message to the power adapter, and the query message is configured to query whether the power adapter supports the quick charging mode, the communication control circuit is further configured to receive a response message from the power adapter, and the response message is configured to indicate that the power adapter supports the quick charging mode; and the communication control circuit is further configured to transmit an indication message to the power adapter, wherein the indication message is configured to instruct the power adapter to activate the quick charging mode.

16. The mobile terminal of claim 10, wherein the communication control circuit is configured to receive the second instruction from the power adapter, and the second instruction is configured to query whether a current output voltage of the power adapter is proper to be the charging voltage of the quick charging mode, the communication control circuit is further configured to transmit a reply instruction for the second instruction to the power adapter, and the reply instruction for the second instruction is configured to indicate that the current output voltage of the power adapter is proper, high, or low, so as to cause the power adapter to determine the charging voltage of the quick charging mode according to the reply instruction for the second instruction.

17. The mobile terminal of claim 16, wherein the communication control circuit is configured to transmit the reply instruction for the second instruction to the power adapter when the mobile terminal determines that the current output voltage of the power adapter is greater than the voltage of the battery of the mobile terminal and a voltage difference between the current output voltage of the power adapter and the voltage of the battery is within a preset voltage difference threshold range, and the reply instruction for the second instruction is configured to indicate that the current output voltage of the power adapter is proper.

18. The mobile terminal of claim 10, wherein the communication control circuit is further configured to determine a time length of the handshake communication based on the second instruction, and when the time length is greater than a preset time length threshold, the communication control circuit is further configured to determine that the handshake communication based on the second instruction is abnormal, exit the handshake communication of the quick charging mode, or redetermine whether to activate the quick charging mode.

19. The mobile terminal of claim 10, wherein the communication control circuit is configured to receive a third instruction from the power adapter, and the third instruction is configured to query a maximum charging current which is currently supported by the mobile terminal, the communication control circuit is further configured to transmit a reply instruction for the third instruction to the power adapter, and the reply instruction for the third instruction indicates the maximum charging current which is currently supported by the mobile terminal, so as to cause the power adapter to determine the charging current of the quick charging mode according to the reply instruction for the third instruction.

20. The mobile terminal of claim 10, wherein the communication control circuit is configured to receive the fourth instruction from the power adapter during the constant current phase, and the fourth instruction is configured to query the current voltage of the battery of the mobile terminal, and the communication control circuit is configured to transmit a reply instruction for the fourth instruction to the power adapter, and the reply instruction for the fourth instruction is configured to indicate the current voltage of the battery of the mobile terminal, so as to cause the power adapter to adjust the output current of the power adapter according to the current voltage of the battery.

21. The mobile terminal of claim 20, wherein the communication control circuit is configured to receive the fourth instruction from the power adapter every preset time interval.

22. The mobile terminal of claim 20, wherein the communication control circuit is further configured to transmit an information for indicating path impedance of the mobile terminal to the power adapter to cause the power adapter to determine whether the USB interface is in bad contact according to the path impedance during the constant current phase, receive a fifth instruction from the power adapter when the power adapter determines that USB interface is in bad contact, and the fifth instruction is configured to indicate that the USB interface is in bad contact, and the power adapter is ready to exit the quick charging mode or redetermine whether to activate the quick charging mode.

23. The mobile terminal of claim 10, wherein during adjustment of the output current of the power adapter, a communication time interval between the power adapter and the mobile terminal is less than the preset time interval, otherwise the power adapter exits the quick charging mode or again activate the quick charging mode.

24. The mobile terminal of claim 10, wherein stop of the quick charging mode comprises two stop modes: a recoverable stop mode and a non-recoverable stop mode, in the recoverable stop mode, the power adapter or the mobile terminal again activates the quick charging mode, and the power adapter again conducts the handshake communication with the mobile terminal, in the non-recoverable stop mode, the power adapter or the mobile terminal does not activate the quick charging mode again, and the power adapter charges the mobile terminal in the normal charging mode, or does not charge the mobile terminal again.

25. The mobile terminal of claim 24, wherein a condition suitable for the recoverable stop mode comprises: when a communication fault occurs between the power adapter and the mobile terminal, or the battery of the mobile terminal becomes abnormal, the quick charging mode is stopped, the power adapter requeries the mobile terminal for whether to agree to activate the quick charging mode, and the mobile terminal agrees to again activate the quick charging mode; or a condition suitable for the non-recoverable stop mode comprises: when the battery of the mobile terminal is fully charged or the USB interface is in bad contact, the power adapter requeries the mobile terminal for whether to agree to activate the quick charging mode, and the mobile terminal disagrees to activate the quick charging mode.

26. The mobile terminal of claim 10, wherein the communication control circuit is further configured to determine whether the data line of the USB interface of the power adapter and the mobile terminal is the data line which is able to support the quick charging mode.

27. The mobile terminal of claim 10, wherein during the process of the communication between the power adapter and the mobile terminal, the power adapter is used as a host device to provide clock signal for synchronization between the power adapter and the mobile terminal.

* * * * *